(12) United States Patent
Boon

(10) Patent No.: US 6,400,889 B1
(45) Date of Patent: Jun. 4, 2002

(54) IMAGE PROCESSING METHOD FOR DECODING COMPRESSED IMAGE DATA

(75) Inventor: Choong Seng Boon, Moriguchi (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/660,441

(22) Filed: Sep. 12, 2000

Related U.S. Application Data

(62) Division of application No. 09/381,688, filed as application No. PCT/JP99/00275 on Jan. 25, 1999.

(30) Foreign Application Priority Data

Jan. 23, 1998 (JP) .......................................... 10-011068

(51) Int. Cl.⁷ .............................................. H04N 5/783
(52) U.S. Cl. ............................. 386/68; 386/69; 386/95; 386/111; 348/423.1
(58) Field of Search ............................. 386/68, 69, 70, 386/81, 82, 95, 111–112, 125–126; 348/423.1; 370/474, 375, 376, 389, 393, 395, 503, 509, 378, 379; 707/100–101, 200; H04N 5/76, 5/92, 5/783, 9/79

(56) References Cited

U.S. PATENT DOCUMENTS

| | | | |
|---|---|---|---|
| 5,450,209 A | | 9/1995 | Niimura et al. |
| 5,535,008 A | * | 7/1996 | Yamagishi et al. ......... 386/109 |
| 5,543,847 A | | 8/1996 | Kato |
| 5,737,479 A | * | 4/1998 | Fujinami .................... 386/111 |
| 5,946,447 A | * | 8/1999 | Nakagawa et al. ........... 386/98 |
| 5,983,229 A | * | 11/1999 | Houchin et al. ............ 370/474 |
| 6,112,009 A | | 8/2000 | Kikuchi et al. |
| 6,215,952 B1 | * | 4/2001 | Yoshio et al. ................. 386/95 |
| 6,229,952 B1 | * | 5/2001 | Nonomura et al. ......... 386/126 |

FOREIGN PATENT DOCUMENTS

| | | |
|---|---|---|
| EP | 0 606 868 | 7/1994 |
| EP | 0 695 098 | 1/1996 |
| JP | 5-308610 | 11/1993 |
| JP | 6-181569 | 6/1994 |
| JP | 6-261303 | 9/1994 |
| JP | 8-45249 | 2/1996 |
| JP | 8-163508 | 6/1996 |
| JP | 8-339637 | 12/1996 |
| JP | 9-139915 | 5/1997 |
| JP | 11-196411 | 7/1999 |
| KR | 94-17883 | 7/1994 |

* cited by examiner

Primary Examiner—Thai Tran
(74) Attorney, Agent, or Firm—Wenderoth, Lind & Ponack, L.L.P.

(57) ABSTRACT

In an image transmission method of the first embodiment, as shown in FIG. 1, when compressed image data Dv obtained by compressively coding digital image data corresponding to a moving picture is transmitted, an identification flag Hfd indicating whether or not the compressed image data is suitable for use in random and independent reproduction, is transmitted subsequently to a synchronous signal Hsd positioned at the beginning of a header Hv. At a reproducing end for reproducing the compressed image data transmitted according to the image transmission method, when analyzing the header Hv added to the compressed image data Dv corresponding to one moving picture, it is decided whether or not the compressed image data Dv is suitable for use in the random reproduction in a short time, by analysis of the identification flag Hfd.

5 Claims, 12 Drawing Sheets

IMAGE PROCESSING METHOD FOR DECODING COMPRESSED IMAGE DATA

This is a divisional application of Ser. No. 09/381,688, filed Sep. 23, 1999, pending.

This application is a 371 or PCT/JP99/00275 filed Jan. 25, 1999.

TECHNICAL FIELD

The present invention relates to an image transmission method, an image processing method, an image processing apparatus, and a data storage medium and, more particularly to a method for transmitting coded digital image data corresponding to an image comprising plural frames, a method and an apparatus for coding digital image data, a method and an apparatus for decoding the coded digital image data, and a data storage medium which contains a program for implementing coding and decoding processes for the digital image data by using a computer.

BACKGROUND ART

In order to efficiently store or transmit digital image information, i.e., image data of a digital signal, it is required that the digital image information be compressively coded. As available methods for compressively coding the digital image information, there are waveform coding methods such as sub-band, wavelet, fractal, and so forth, as well as DCT (Discrete Cosine Transform) typical of an image processing technique according to JPEG (Joint Photographic Coding Experts Group) or MPEG (Moving Picture Experts Group).

Meanwhile, one method for eliminating redundant image information between adjacent frames and the like is to perform inter-frame prediction using motion compensation by representing values of pixels in a current frame by differences between these pixel values and pixel values of pixels in a previous (past) frame, and perform coding of a difference signal corresponding to the difference.

Hereinafter, an image coding method and an image decoding method according to MPEG standard which performs a DCT process including motion compensation, will be briefly described.

In this image coding method, an input image signal is divided into plural image signals respectively corresponding to plural blocks (macroblocks) in one frame, and then the image signals are coded for each macroblock. One macroblock corresponds to an image display region composed of (16×16) pixels. When the input image signal corresponds to an object image, the image signal is divided into plural blocks (macroblocks) composing a display region (object region) corresponding to the object image in one frame.

The image signal corresponding to each macroblock is divided into image signals respectively corresponding to subblocks corresponding to image display regions each composed of (8×8) pixels, and then the image signals are subjected to the DCT process for each subblock to generate DCT coefficients. Then the DCT coefficients are quantized to generate quantization coefficients for each subblock. Thus, the method for coding the image signal corresponding to the subblock by the DCT process and quantization process is termed an "intra-frame coding scheme".

At a receiving end, the quantization coefficients are inversely quantized and are then subjected to an inverse DCT process for each subblock to reproduce an image signal corresponding to the macroblock. Coded data corresponding to a frame (I picture) in which the image signal has been coded by the intra-frame coding method, can be reproduced independently. That is, it can be decoded without referring to image data of another frame.

On the other hand, there is a coding method termed an "inter-frame coding scheme". In this coding method, initially, a method for detecting motion of an image on a frame such as "block matching" is employed to detect a region composed of (16×16) pixels with the smallest errors between pixel values thereof and pixel values of a target macroblock to-be-coded as a prediction macroblock, from an image signal corresponding to a coded frame which is temporally adjacent to a frame to-be-coded.

Subsequently, the image signal of the prediction macroblock is subtracted from the image signal of the target macroblock to produce a difference signal of the target macroblock, which is divided into difference signals respectively corresponding to subblocks each composed of (8×8) pixels. Then the difference signals are subjected to the DCT process to generate the DCT coefficients for each subblock, which are quantized for each subblock to generate quantization coefficients.

The image signal corresponding to the object image is inter-frame coded in a similar manner.

At the receiving end, the quantization coefficients (quantized DCT coefficients) are inversely quantized and are then subjected to the inverse DCT process for each subblock to restore the difference signal of the macroblock. Then, from an image signal of a decoded frame, a prediction signal of an image signal corresponding to a target macroblock to-be-decoded is produced by motion compensation. Then, the prediction signal and the restored difference signal are added to reproduce the image signal of the target macroblock. Coded data corresponding to the frame (P picture or B picture) in which the image signal has been coded by the inter-frame coding method cannot be reproduced independently. That is, it cannot be decoded without referring to the image signal of another frame in the reproduction process.

Subsequently, a structure of compressed image data (bit stream) corresponding to a moving picture composed of plural frames (pictures), will be described.

FIG. 10(a) shows a structure of image data (moving picture data) corresponding to one moving picture. One moving picture comprises plural frames. In FIG. 10(a), moving picture data D comprises frame data P(1)–P(n)(n: natural number) corresponding to respective frames.

FIG. 10(b) shows a structure of intra-frame compressed image data Da obtained by performing the intra-frame coding process to the respective frame data P(1)–P(n) composing the moving picture data D.

The intra-frame compressed image data Da comprises coded frame data Pa(l)–Pa(n) of respective frames and a header Ha comprising data common to these frames. The frames are intra-frame coded I pictures. According to MPEG4, the header Ha is called a "VOL (Video Object Layer)."

FIG. 10(c) shows a structure of inter-frame compressed image data Db obtained by performing the intra-frame coding process to specified frame data of the frame data P(1)–P(n) and by performing the inter-frame coding process to the other frame data.

The inter-frame coding process includes two types of processing. One is a forward predictive coding process which performs coding of a target frame to-be-coded by referring to a previous (forward) frame, and the other is a bidirectionally predictive coding process which performs coding of the target frame by referring to previous and subsequent (forward and backward)frames.

The inter-frame compressed image data Db comprises coded frame data Pb(1)–Pb(n) of respective frames and a header Hb comprising data common to these frames. As illustrated, the first frame of the moving picture is the intra-frame coded I picture and the other frames are P pictures which have been subjected to the forward predictive coding process or B pictures which have been subjected to the bidirectionally predictive coding process.

Since the intra-frame compressed image data Da is produced by performing the intra-frame coding process for every frame of the moving picture without reference to another frame, it is very suitable for use in random reproduction (decoding), although its coding efficiency is relatively low. In other words, one advantage of the use of the intra-frame compressed image data Da is that frames to-be-decoded are selected randomly and decoded immediately to reproduce an image. Particularly when editing the compressed image data, the intra-frame compressed image data is easier to handle than the inter-frame compressed image data. This is because the intra-frame compressed image data is produced independently of another frame data but the inter-frame compressed image data is not.

On the other hand, since the inter-frame compressed image data Db is produced by performing the inter-frame coding process to almost all the frames of the moving picture with reference to another frame and therefore its coding efficiency is high, it is less suitable for use in random reproduction (decoding). In the inter-frame compressed image data Db, when decoding starts from the P picture or the B picture as the target frame to-be-decoded, it is necessary to decode an independently decodable frame present before the target frame. This is because the target frame to-be-decoded is the frame which has been coded with reference to another frame.

For instance, in the intra-frame compressed image data Da, coded frame data Pae(1)–Pae(m) (m: natural number) corresponding to 30-second data positioned at the back of a one-hour moving picture can be reproduced starting from the coded frame data Pae(1) at the beginning of these frame data (see FIG. 10(b)).

On the other hand, in the inter-frame compressed image data Db, when reproducing coded frame data Pbe(1)–Pbe(m) corresponding to 30-second data positioned at the back of a one-hour moving picture, the coded frame data Pbe(1) at the beginning of these data cannot be first reproduced (see FIG. 10(c)). The coded frame data Pbe(1) cannot be reproduced until from independently reproducible data(coded frame data Pb(1) corresponding to the first frame of the moving picture) through coded frame data present just before the data Pbe(1) have been decoded. This is because the coded frame data Pbe(1) is the data which has been coded with reference to another frame.

Meanwhile, a fast forward playback process which skips S (S: natural number) frames can be performed to the intra-frame compressed image data Da (see FIG. 11(a)). This is because coded frame data Pa(1), Pas(1)–Pas(f) (f: natural number) to be decoded in the fast forward playback process correspond to intra-frame coded I pictures which can be reproduced independently without reference to another frame data. A fast rewind playback process as the reverse of the fast forward playback process, can also be performed to the intra-frame compressed image data Da in the same manner.

On the other hand, in practice, the fast forward playback process cannot be performed to the inter-frame compressed image data Db (see FIG. 11(b)). This is because each of the coded frame data Pbs(1)–Pbs(f) to be decoded at the fast forward playback process corresponds to the inter-frame coded P picture or the inter-frame coded B picture. The respective coded frame data Pbs(1), Pbs(2), Pbs (3), . . . , Pbs(f) cannot be decoded until the corresponding waiting times tb1, tb2, tb3, . . . tbf, i.e., times required for decoding all the coded frame data present before the respective data Pbs(1)–Pbs(f) have elapsed. In other words, the coded frame data Pbs(1)–Pbs(f) to be decoded at the fast forward playback process are reproduced at the same timing when they are reproduced in a normal playback process.

Consequently, if the fast forward playback process is performed to the inter-frame compressed image data Db, the resulting reproduced image of the moving picture becomes reproduced still pictures of the coded frame data Pbs(1)–Pbs (f) which are sequentially displayed at regular time intervals.

The fast rewind playback process cannot be performed to the inter-frame compressed image data Db, since coded frame data of the last frame cannot be reproduced until all the coded frame data has been decoded.

Each of the headers Ha and Hb of the corresponding compressed image data Da and Db contains an identification flag indicating whether or not the corresponding compressed image data is suitable for use in the independent reproduction.

As solutions to the problem associated with trade-off between the efficiency in compressively coding the image data and suitability for the fast forward playback process, the followings solutions are conceived.

The first solution is, as shown in FIG. 12, to store the intra-frame compressed image data Da suitable for use in the fast forward playback process and the inter-frame compressed image data Db from which a reproduced image of a high quality is obtained, in a data storage medium M, as the compressed image data of the moving picture. In FIG. 12, reference numerals D1–Dk designate compressed image data corresponding to other moving pictures which contain headers H1–Hk,respectively. The header Ha of the data Da contains a flag indicating that the data Da is well suitable for use in the independent reproduction. The header Hb of the data Db contains a flag indicating that the data Db is less suitable for use in the independent reproduction.

In the fast forward playback process, according to the respective flags contained in the corresponding headers Ha and Hb, the intra-frame compressed image data Da is read from the data storage medium M as the compressed image data of one moving picture. On the other hand, in the normal playback process, the inter-frame compressed image data Db is read from the data storage medium M.

The second solution is to insert plural pieces of coded frame data corresponding to the I pictures into the inter-frame compressed image data Db at intervals shorter than normal intervals. In general, the coded frame data corresponding to the I pictures is inserted into the compressed image data such that two of plural frames reproduced for 0.5 second are the I pictures. This inter-frame compressed image data Db contains the flag indicating that the data Db is suitable for use in independent reproduction. In this case, in the fast forward playback process, according to picture type flags (not shown) added to flames, each indicating that the corresponding coded frame data corresponds to the I picture, only the coded frame data corresponding to the I pictures can be decoded.

The third solution is, because coded frame data corresponding to some of the P pictures is independently reproducible, to add flags indicating this to these coded frame data such coded frame data corresponding to some of the P pictures is obtained by coding without reference to image data of another frame like the coded frame data corresponding to the I pictures, although the corresponding picture type flags indicate the "P pictures". The coded frame data corresponding to these specified P pictures is independently reproducible. Hence, flags indicating that the coded frame data corresponding to these specified P pictures is suitable for use in independent reproduction are added thereto. So, in the fast forward playback process, according to the picture type flags and these independent reproduction suitability flags (not shown), only coded frame data corresponding to the I pictures and the specified P pictures are decoded.

FIG. 11(c) shows a structure of the inter-frame compressed image data which contains the above independent reproduction suitability flags added to the coded frame data corresponding to the specified P pictures.

In inter-frame compressed image data Dc, headers Hc1, Hc2, . . . , Hcf each containing the suitability flag are inserted just before coded frame data Pcs(1)–Pcs(f) corresponding to the specified P pictures (expressed as P' in the figure), respectively. In the figure, Hc designates a header of the inter-frame compressed image data Dc, and Pc(1)–Pc(n) designate coded frame data of respective frames.

The structures of the headers of the compressed image data Da and Db will be described with reference to FIG. 13. In FIG. 13, for the sake of simplicity, the compressed image data is shown without distinguishing between the intra-frame compressed image data Da and the inter-frame compressed image data Db.

As mentioned previously, the compressed image data D comprises the header H containing data common to respective frames which is placed at the beginning of the data D and the following coded frame data P.

The header H is composed of a synchronous signal Hsd, data common to respective frames Hcd, a flag Hfd relating to suitability for independent reproduction, and alignment data Had for aligning this data.

The compressed image data corresponding to one moving picture thus contains the information (flag) indicating whether or not coded frame data corresponding to all the frames is independently reproducible. When the coded frame data corresponding to all the frames of one moving picture is independently reproducible the flag has a value indicating that the corresponding compressed image data is well suitable for use in independent reproduction, whereas when one moving picture contains little coded frame data which is independently reproducible, the flag has a value indicating that the corresponding compressed image data is less suitable for use in independent reproduction.

The flag is contained in the header H including common data (data common to respective frames) at the beginning of the compressed image data.

Hereinafter, a description will be given of examples of data alignment in the header of the compressed image data with reference to tables 1–3 shown below. The data shown in the tables 1–3 are continuously aligned in the header in the transmission order.

Placed at the beginning of the header is a synchronous signal 902 indicating the start of the moving picture, which is represented as a unique fixed-length code (32 bits). Following the synchronous signal 902, various types of common data 903–913 common to respective frames are placed. In the common data 903–913, the data 910 is represented by a variable-length code and the data 903–909 and 911–913 are each represented by a code having plural fixed-bit lengths.

Following these common data 903–913, a flag 914 relating to suitability for independent reproduction and alignment data 915 are placed.

The flag 914 indicates whether or not the coded frame data of frames is randomly and independently reproducible. The value "1" of the flag indicates that all the coded frame data of the corresponding compressed image data of the moving picture is independently reproducible, while the value "0" indicates that most of the coded frame data of the corresponding compressed image data is not independently reproducible. The alignment data 915 is used for aligning the synchronous signal 902 through the flag 914.

Following the alignment data 915, placed are data 916 and 917 relating to coded frame data obtained by coding image data corresponding to respective frames of the moving picture. In actuality, these data 916 and 917 include specific data such as DCT coefficients or quantization steps according to MPEG 1, 2, and 4, although these are illustrated as one data group in this illustrated example.

It should be remembered that the header containing such common data is placed at the beginning of the compressed image data of one moving picture. If the inter-frame compressed image data including coded frame data which is not independently reproducible includes some independently reproducible coded frame data (coded frame data corresponding to the I picture) which is arranged periodically, effectiveness is provided by inserting common data containing a flag relating to a possibility of independent reproduction rather than the flag relating to suitability for independent reproduction. The former flag indicates whether or not the corresponding coded frame data is independently reproducible without reference to another frame data.

In the fast forward playback process performed to the inter-frame compressed image data into which such common data is periodically inserted, the independently reproducible coded frame data corresponding to the I picture is selectively decoded.

TABLE 1

| | | | No. of bits | Mnemonic |
|---|---|---|---|---|
| 901 | ~ Video Object Layer( ){ | | | |
| 902 | ~ video_object_layer_start_code | | 32 | bslbf |
| | /*4least significant bits specify video_object_layer_id value*/ | | | |
| | | is_object_layer_identifier ~ 903a | 1 | uimsbf |
| | | if(is_object_layer_identifier){ | | |
| 903 | | visual_object_layer_verid ~ 903b | 4 | uimsbf |
| | | visual_object_layer_priority ~ 903c | 3 | uimsbf |

TABLE 1-continued

| | | No. of bits | Mnemonic |
|---|---|---|---|
| 901 ~ | Video Object Layer( ){ | | |
| | } | | |
| | vol_control_parameters | 1 | bslbf |
| | if(vol_control_parameters) | | |
| |   aspect_ratio_info | 4 | uimsbf |
| |   vop_rate_code | 4 | uimsbf |
| 904 |   bit_rate | 30 | uimsbf |
| |   vbv_buffer_size | 18 | uimsbf |
| |   chroma_format | 2 | uimsbf |
| |   low_delay | 1 | uimsbf |
| | } | | |
| | video_object_layer_shape | 2 | uimsbf |
| 905 | vop_time_increment_resolution | 15 | uimsbf |
| | fixed_vop_rate | 1 | bslbf |
| 906 ~ | if(video_object_layer_shape!="binary only"){ | | |
| |   if(video_object_layer_shape=="rectangular"){ | | |
| |     marker_bit | 1 | bslbf |
| |     video_object_layer_width | 13 | uimsbf |
| 907 |     marker_bit | 1 | bslbf |
| |     video_object_layer_height | 13 | uimsbf |
| |   } | | |
| |   obmc_disable | 1 | bslbf |

TABLE 2

| | | | |
|---|---|---|---|
| | sprite_enable | 1 | bslbf |
| | if(sprite_enable){ | | |
| |   sprite_width | 13 | uimsbf |
| |   marker_bit | 1 | bslbf |
| |   sprite_height | 13 | uimsbf |
| |   marker_bit | 1 | bslbf |
| |   sprite_left_coodinate | 13 | simsbf |
| |   marker_bit | 1 | bslbf |
| |   sprite_top_coodinate | 13 | simsbf |
| |   marker_bit | 1 | bslbf |
| |   no_of_sprite_warping_points | 6 | uimsbf |
| 908 |   sprite_warping_accuracy | 2 | uimsbf |
| |   sprite_brightness_change | 1 | bslbf |
| |   if(video_object_layer_shape=="rectangular"){ | | |
| |     init_sprite_width | 13 | uimsbf |
| |     marker_bit | 1 | bslbf |
| |     init_sprite_height | 13 | uimsbf |
| |     marker_bit | 1 | bslbf |
| |     init_sprite_left_coodinate | 13 | simsbf |
| |     marker_bit | 1 | bslbf |
| |     init_sprite_top_coodinate | 13 | simsbf |
| |   } | | |
| | } | | |
| | not_8_bit | 1 | bslbf |
| | if(not_8_bit){ | | |
| 909 |   quant_precision | 4 | uimsbf |
| |   bits_per_pixel | 4 | uimsbf |
| | } | | |
| | quant_type | 1 | bslbf |
| | if(quant_type){ | | |
| |   load_intra_quant_mat | 1 | bslbf |
| |   if(load_intra_quant_mat) | | |
| |     intra_quant_mat | 8*[2–64] | uimsbf |
| |   load_nonintra_quant_mat | 1 | bslbf |
| |   if(load_nonintra_quant_mat) | | |
| |     nonintra_quant_mat | 8*[2–64] | uimsbf |
| | } | | |
| 911 ~ | complexity_estimation_disable | 1 | bslbf |

TABLE 3

| | | | |
|---|---|---|---|
| | error_resilient_disable | 1 | bslbf |
| | if(!error_resilient_disable){ | | |
| 912 |   data_partitioned | 1 | bslbf |
| |   reversible_vlc | 1 | bslbf |
| | } | | |
| | scalability | 1 | bslbf |

TABLE 3-continued

```
       ⎧  if(scalability){
       ⎪      ref_layer_id                   4    uimsbf
       ⎪      ref_layer_sampling_direc       1    bslbf
       ⎪      hor_sampling_factor_n          5    uimsbf
913    ⎨      hor_sampline_factor_m          5    uimsbf
       ⎪      vert_sampling_factor_n         5    uimsbf
       ⎪      vert_sampling_factor_m         5    uimsbf
       ⎪      enhancement_type               1    bslbf
       ⎩  }
          }
914  ~ random_accessible_vol                 1    bslbf
915  ~ next_start_code( )
       ⎧  if(sprite—enable)
916    ⎨
       ⎩     decode_init_sprite( )
       ⎧  do{
       ⎪    if(next_bits( )=group_of_vop_start_code)
       ⎪       Group_of_Video object Plane( )
917    ⎨    Video Object Plane( )
       ⎪  }while((next_bits( )=group_of_vop_start_code)||
       ⎪       (next_bits( )=vop_start_code)
       ⎩  }
```

When performing the fast forward playback process or the fast rewind playback process to the compressed image data of the moving picture, the coded frame data is randomly selected from the compressed image data and then decoded, and therefore, it is necessary to quickly decide whether or not the compressed image data is suitable for use in the fast forward playback process or whether or not the coded frame data of the compressed image data is independently reproducible.

However, it is impossible to quickly decide these (suitability for independent reproduction and possibility of independent reproduction) from the headers added to the conventional compressed image data and coded frame data.

In order to decide whether or not the compressed image data is suitable for use in independent reproduction, the flag (data 914 shown in the tables 1–3) in the header containing the common data is extracted and analyzed.

To check whether or not the value of the flag 914 in the header is "1", it is necessary that all the common data 903–913 placed before the flag 914 is extracted and then analyzed by parsing these common data before the flag 914 is analyzed. For instance, until it has been checked that the value of the common data 903a is "1", it is impossible to decide whether or not the common data 903b and 903c are present.

In the header added to the conventional compressed image data, various data such as the synchronous signal 902 indicating the start of the moving picture and the common data 903–913 for the coded frame data, are placed before the flag indicating whether or not the compressed image data is suitable for use in the independent reproduction. Much of this common data often serves as a switch or the like. This means that the following data processing depends upon the value of such common data.

For the above reason, much time is required from when data analysis of the header starts until analysis of the independent reproduction suitability flag starts.

SUMMARY OF THE INVENTION

The present invention is directed to solving the aforementioned problem and an object of the present invention is to provide an image processing method comprising a coding process for producing compressed image data of a data structure which makes it possible to quickly decide whether or not the compressed image data corresponding to one moving picture and coded frame data are suitable for use in independent reproduction and whether or not they are independently reproducible from headers added to these data, and a decoding process in a way adapted to the coding process.

Another object of the present invention is to provide a data storage medium which contains an image processing program for making a computer perform the coding process and the decoding process.

DISCLOSURE OF THE INVENTION

According to the present invention, there is provided an image processing method for compressively coding digital image data corresponding to an image comprising plural frames, and the method comprises the steps of: generating a header which includes data common to respective frames; and compressively coding frame data corresponding to respective frames to produce compressed frame data, wherein the header is generated in such a way that it includes an identification flag indicating whether or not the compressed image data is suitable for use in a random reproduction process which randomly selects compressed frame data of arbitrary frames to reproduce frame data, and from code data at the beginning of the header to code data immediately before the identification flag are fixed in length.

In the image processing method so constructed, when digital image data corresponding to one moving picture is compressively coded to produce compressed image data, the header including the identification flag indicating whether or not the compressed image data is suitable for use in the random (independent) reproduction process, is added to the compressed image data, and in the header, from the code data at the beginning thereof to the code data just before the identification flag are fixed in length. Therefore, when analyzing the header, it is possible to quickly analyze the identification flag and thereby decide whether or not the compressed image data is suitable for use in the random reproduction process in a short time.

According to the present invention, in the aforementioned image processing method, the step of compressively coding frame data is performed after the step of generating the header, and the step of generating the header comprises generating a synchronous signal indicating a head of the compressed image data, the identification flag, and the data common to respective frames, in this order.

In the image processing method so constructed, in the header, the synchronous signal, the identification flag, and the common data are aligned in this order. Therefore, at the decoding end, the identification flag is analyzed immediately after the synchronous signal is analyzed.

According to the present invention, in the afore-mentioned image processing method, the step of compressively coding frame data is performed after the step of generating the header, and the step of generating the header comprises generating a synchronous signal indicating a head of the compressed image data, fixed-length code data as the data common to respective frames, the identification flag, and variable-length code data as the data common to respective frames, in this order.

In the image processing method so constructed, in the header, the synchronous signal, the common data of the fixed-length code, the identification flag, and the variable length code data are aligned in this order. Therefore, the identification flag is analyzed immediately after the synchronous signal is analyzed without analyzing the common data as required.

According to the present invention, in the afore-mentioned image processing method, the step of compressively coding frame data comprises: a first compressive coding step for compressively coding frame data corresponding to a frame to-be-processed without reference to frame data corresponding to another frame, to produce first compressed frame data; and a second compressive coding step for compressively coding frame data corresponding to a frame to-be-processed with reference to frame data corresponding to another frame, to produce second compressed frame data, wherein the identification flag included in compressed image data composed of the first compressed frame data indicates that the compressed image data is suitable for use in the random reproduction process, and the identification flag included in compressed image data composed of the first compressed frame data and the second compressed frame data indicates that the compressed image data is less suitable for use in the random reproduction process.

In the image processing method so constructed, the identification flag of the compressed image data obtained by the first compressive coding process without reference to another frame, indicates that the compressed image data is suitable for use in the random reproduction process, while the identification flag of the compressed image data obtained by the second compressive coding process with reference to another frame and the first compressive coding process, indicates that the compressed image data is less suitable for use in the random reproduction process. Therefore, at the decoding end, it is possible to quickly distinguish between the compressed image data suitable for use in the random reproduction process and the compressed image data with higher coding efficiency which is less suitable for use in the random reproduction process.

According to the present invention, the afore-mentioned image processing method, further comprises the step of: generating an auxiliary header including data common to the respective frames and individual data for a specified frame, wherein the auxiliary header is generated in such a way that the auxiliary header is added before compressed frame data of the specified frame when the step of compressively coding frame data is performed after the step of generating the header, and in the step of generating the auxiliary header, the auxiliary header is generated in such a way that it includes a flag indicating whether or not the compressed frame data of the specified frame is independently reproducible without reference to frame data of another frame, and from code data at the beginning of the auxiliary header to code data immediately before the flag are fixed in length.

In the image processing method so constructed, the auxiliary header is added to compressed frame data of the specified frame of the compressed image data, and the auxiliary header includes the flag indicating whether or not the compressed frame data of the specified frame is independently reproducible. Also, in the auxiliary header, from code data at the beginning thereof to code data just before the identification flag are fixed in length. Therefore, it is possible to decide whether or not the compressed frame data is independently reproducible for each frame.

According to the present invention, there is provided an image processing method for decoding compressed image data obtained by compressively coding digital image data corresponding to an image comprising plural frames to provide reproduced image data corresponding to the image, and the method comprises the steps of: analyzing a header including data common to respective frames which is included in the compressed image data; and decoding compressed frame data obtained by compressively coding frame data of respective frames and included in the compressed image data, to provide reproduced frame data, wherein the step of analyzing the header comprises analyzing fixed-length code data from code data at the beginning of the header to code data immediately before an identification flag included in the header and indicating whether or not the compressed image data is suitable for use in a random reproduction process which randomly selects compressed frame data of arbitrary frames to provide reproduced frame data, and then analyzing the identification flag.

In the image processing method so constructed, when decoding the compressed image data corresponding to one moving picture, the header is analyzed such that analysis of the fixed-length code data from the beginning thereof is followed by analysis of the identification flag indicating whether or not the compressed image data is suitable for use in the independent reproduction. Therefore, when analyzing the header, it is possible to quickly analyze the identification flag and thereby decide whether or not the compressed image data is suitable for use in the random reproduction process in a short time.

According to the present invention, in the afore-mentioned image processing method, the step of decoding compressed frame data is performed after the step of analyzing the header, and thee step of analyzing the header comprises analyzing a synchronous signal indicating a head of the compressed image data, the identification flag, and the data common to respective frames, in this order.

In the image processing method so constructed, when analyzing the header, the synchronous signal, the identification flag, and the common data are analyzed in this order. Therefore, in the decoding process, the identification flag is analyzed immediately after the synchronous signal is analyzed.

According to the present invention, in the afore-mentioned image processing method, the step of decoding compressed frame data is performed after the step of analyzing the header, and the step of analyzing the header comprises analyzing a synchronous signal indicating a head of the compressed image data, fixed-length code data as the data common to respective frames, the identification flag, and variable-length code data as the data common to respective frames, in this order.

In the image processing method so constructed, when analyzing the header, the synchronous signal, fixed-length code data as the common data, the identification flag, and variable-length code data as the common data are analyzed in this order. Therefore, the identification flag is analyzed immediately after the synchronous signal is analyzed without analyzing the common data as required.

According to the present invention, in the aforementioned image processing method, the step of analyzing the header and the step of decoding compressed frame data are performed for first compressed image data composed of first compressed frame data obtained by compressively coding frame data of a frame to-be-processed without reference to frame data of another frame, and performed for second compressed image data composed of the first compressed frame data and second compressed frame data obtained by compressively coding frame data of a frame to-be-processed with reference to frame data of another frame, and the random reproduction process is performed only to the first compressed image data according to the identification flag.

In the image processing method so constructed, reproduction is performed for each of the compressed image data obtained by the first compressive coding process without reference to another frame and compressed image data obtained by the second compressive coding process with reference to another frame and the first compressive coding process. Also, only the first compressed image data is randomly reproduced. Therefore, at the decoding end, the random reproduction process is preferably performed.

According to the present invention, the afore-mentioned image processing method, further comprises the step of: analyzing an auxiliary header added to compressed frame data of a specified frame and including data common to respective frames and individual data for the specified frame, wherein the auxiliary header is analyzed for the specified frame when the step of decoding compressed frame data is performed after the step of analyzing the header, and the step of analyzing the auxiliary header comprises analyzing fixed-length code data from code data at the beginning thereof to code data immediately before a flag included therein and indicating whether or not the compressed frame data of the specified frame is independently reproducible without reference to frame data of another frame, and then analyzing the flag.

In the image processing method so constructed, the auxiliary header added to the compressed frame data of the specified frame is analyzed such that the fixed-length code data from the beginning thereof is analyzed and then the flag in the auxiliary header is analyzed. Therefore, it is possible to decide whether or not the compressed frame data is independently reproducible for each frame.

According to the present invention, there is provided an image processing apparatus for compressively coding digital image data corresponding to an image comprising plural frames to produce compressed image data, and the apparatus comprises: a prediction data generator for generating prediction frame data for target frame data corresponding to a frame to-be-processed based on the target frame data; calculation means for outputting either difference frame data as a difference value between the target frame data and the prediction frame data or the target frame data according to a control signal; a data compressor for compressing data output from the calculation means to produce compressed data; a variable length encoder for performing variable length coding of the compressed data output from the data compressor and outputting compressed frame data of each frame; and control means for generating a header including data common to respective frames based on the digital image data and controlling the calculation means according to an identification flag indicating whether or not the compressed image data is suitable for use in a random reproduction process which randomly selects compressed frame data of arbitrary frames to reproduce frame data, wherein the variable length encoder outputs the header including the identification flag, in which from code data at the beginning of the header to code data immediately before the identification flag are fixed in length.

In the image processing apparatus so constructed, when compressively coding digital image data corresponding to one moving picture to provide compressed image data, the header including the identification flag indicating whether or not the compressed image data is suitable for use in the random (independent) reproduction for arbitrary frames is added to the compressed image data and, in the header, from the code data at the beginning thereof to code data just before the identification flag are fixed in length. Therefore, when analyzing the header added to the compressed image data, it is possible to quickly analyze the identification flag and thereby decide whether or not the compressed image data is suitable for use in the random reproduction process in a short time.

According to the present invention, in the afore-mentioned image processing apparatus of claim 13, the variable length encoder outputs the header before outputting the compressed frame data of respective frames in such a way that a synchronous signal indicating a head of the compressed image data, the identification flag, and the data common to respective frames are output, in this order.

In the image processing apparatus so constructed, in the header, the synchronous signal, the identification flag, and the common data are aligned in this order. Therefore, at the decoding end, the identification flag is analyzed immediately after the synchronous signal is analyzed.

According to the present invention, in the afore-mentioned image processing apparatus, the variable length encoder outputs the header before outputting the compressed frame data of respective frames in such a way that a synchronous signal indicating a head of the compressed image data, fixed-length code data as the data common to respective frames, the identification flag, and variable-length code data as the data common to respective frames are output, in this order.

In the image processing apparatus so constructed, in the header, the synchronous signal, fixed-length code data as the common data, the identification flag, and variable-length code data are aligned in this order. Therefore, the identification flag is analyzed immediately after the synchronous signal is analyzed, without analyzing the common data as required.

According to the present invention, in the afore-mentioned image processing apparatus, the control means controls the calculation means so that all the frames of the image are subjected to a first compressive coding process in which the calculation means outputs the target frame data, the data compressor compresses frame data of a frame to-be-processed without reference to frame data of another frame, and the variable length encoder outputs first compressed frame data, when the identification flag indicates that the compressed image data is suitable for use in the random reproduction process, and the control means controls the calculation means so that specified frames of the image are subjected to a second compressive coding process in which the calculation means outputs the difference frame data, the data compressor compresses frame data of a frame to-be-processed with reference to frame data of another frame, and the variable length encoder outputs second compressed frame data, and frames other than the specified frames are subjected to the first compressive coding process, when the identification flag indicates that the compressed image data is less suitable for use in the random reproduction process.

In the image processing apparatus so constructed, the identification flag of the compressed image data obtained by the first compressive coding process without reference to another frame, indicates that the compressed image data is suitable for use in the random reproduction process, while the identification flag of the compressed image data obtained by the second compressive coding process with reference to another frame and the first compressive coding process, indicates that the compressed image data is less suitable for use in the random reproduction process. Therefore, at the decoding end, it is possible to quickly distinguish between the compressed image data suitable for use in the random reproduction process and the compressed image data with higher coding efficiency which is less suitable for use in the random reproduction process.

According to the present invention, there is provided an image processing apparatus for decoding compressed image data obtained by compressively coding digital image data corresponding to a frame comprising plural frames to provide a reproduced image corresponding to the image, and the apparatus comprises: an analyzer for analyzing a header included in the compressed image data to generate header information, and analyzing data corresponding to each frame included in the compressed image data and outputting compressed frame data; a data decompressor for decompressing the compressed frame data to produce decompressed frame data; calculation means for outputting either frame data obtained by adding the decompressed frame data and prediction frame data thereof or the decompressed frame data as reproduced frame data according to a control signal; a prediction data generator for generating prediction frame data for a frame to-be-processed from target frame data to-be-decompressed corresponding to the frame to-be-processed; and control means for controlling the calculation means according to an identification flag included in the header information and indicating whether or not the compressed image data is suitable for use in a random reproduction process which randomly selects compressed frame data of arbitrary frames to reproduce frame data, wherein the analyzer analyzes the header in such a way that it analyzes the identification flag without analyzing common data composed of fixed-length code data from code data at the beginning of the header to code data immediately before the identification flag as required.

In the image processing apparatus so constructed, when decoding compressed image data corresponding to one moving picture, the header is analyzed such that the identification flag indicating whether or not the compressed image data is suitable for use in the random reproduction process, is analyzed without analyzing the fixed-length code data from the beginning thereof. Therefore, when analyzing the header added to the compressed image data, it is possible to quickly analyze the identification flag and thereby decide whether or not the compressed image data is suitable for use in the random reproduction process in a short time.

According to the present invention, in the aforementioned image processing apparatus, the analyzer analyzes the header in such a way that it analyzes a synchronous signal indicating a head of the compressed image data, the identification flag, and the data common to respective frames, in this order, according to the order in which these data is input to the analyzer.

In the image processing apparatus so constructed, the synchronous signal, the identification flag, and the common data are analyzed in this order. Therefore, at the decoding end, the identification flag is analyzed immediately after the synchronous signal is analyzed.

According to the present invention, in the aforementioned image processing apparatus, the analyzer analyzes the header in such a way that it analyzes a synchronous signal indicating a head of the compressed image data, fixed-length code data as the data common to respective frames, the identification flag, and variable-length code data as the data common to respective frames, in this order, according to the order in which these data is input to the analyzer.

In the image processing apparatus so constructed, the synchronous signal, the fixed-length code data as the common data, the identification flag, and the variable-length code data as the common data are analyzed in this order. Therefore, the identification flag is analyzed immediately after the synchronous signal is analyzed without analyzing the fixed-length code data as the common data as required.

According to the present invention, in the aforementioned image processing apparatus, the control means controls the calculation means so that all the frames of the image are subjected to a first decompressive decoding process without reference to another frame in which decompressed frame data corresponding to the frame to-be-processed is output from the calculation means as reproduced frame data, when the identification flag indicates that the compressed image data is suitable for use in the random reproduction process, and the control means controls the calculation means so that specified frames of the image are subjected to a second decompressive decoding process with reference to another frame in which an addition value of decompressed frame data of the frame to-be-processed and reproduced frame data of another frame is output from the calculation means as reproduced frame data of the frame to-be-processed and frames other than the specified frames are subjected to the first decompressive decoding process, when the identification flag indicates that the compressed image data is less suitable for use in the random reproduction process.

In the image processing apparatus so constructed, reproduction is performed for each of the compressed image data obtained by the first compressive coding process without reference to another frame and compressed image data obtained by the second compressive coding process with reference to another frame and the first compressive coding process. Also, only the first compressed image data is randomly reproduced. Therefore, at the decoding end, the random reproduction process is preferably performed.

According to the present invention, there is provided a data storage medium for storing an image processing program for compressively coding digital image data corresponding to an image comprising plural frames, and the image processing program makes a computer perform a compressive coding process to the digital image data according to the afore-mentioned image processing method.

Using the data storage medium so constructed, by loading the coding program into the computer, when digital image data corresponding to one moving picture is compressively coded to provide compressed image data, the header including the identification flag indicating whether or not the compressed image data is suitable for use in the random (independent) reproduction, is added to the compressed image data, and in the header, from the code data at the beginning to the code data before the identification flag are fixed in length. Such coding process is executed by the computer. Therefore, it is possible to implement an image coding process by software in which the identification flag is quickly analyzed and thereby whether or not the compressed image data is suitable for use in the random reproduction process is decided in a short time when analyzing the header added to the compressed image data.

According to the present invention, there is provided a data storage medium for storing an image processing program for decompressively decoding compressed image data obtained by compressively coding digital image data corresponding to an image comprising plural frames, and the image processing program makes a computer perform a decoding process to the compressed image data according to the afore-mentioned image processing method.

Using the storage medium so constructed, by loading the decoding program into the computer, when decoding the compressed image data corresponding to one moving picture, the header is analyzed such that analysis of the fixed-length code data from the beginning thereof is followed by analysis of the identification flag indicating whether or not the compressed image data is suitable for use in the independent reproduction. Such decoding process is executed by the computer. Therefore, it is possible to implement the decoding process by software in which the identification flag is quickly analyzed and thereby it is decided whether or not the compressed image data is suitable for use in the random reproduction process in a short time when analyzing the header added to the compressed image data.

BRIEF DESCRIPTION OF THE DRAWINGS

FIGS. 1(a)–1(c) are diagrams showing data structures of image signals according to a first embodiment, wherein FIG. 1(a) shows a sequence header, FIG. 1(b) shows compressed image data of a data structure which is suitable for use in independent reproduction, and FIG. 1(c) shows compressed image data of a data structure with high compression efficiency.

FIGS. 5(a)–5(b) diagrams showing data structures of compressed image data according to modifications of the first embodiment, wherein FIG. 5(a) shows a data structure of compressed image data which is suitable for use in independent reproduction, and FIG. 5(b) shows a data structure of compressed image data with high compression efficiency which is suitable for use in independent reproduction.

FIGS. 10(a)–10(c) are diagrams showing data structures of conventional coded image signals (compressed data), wherein FIG. 10(a) shows compressed image data corresponding to one moving picture, FIG. 10(b) shows compressed image data which is suitable for use in independent reproduction, and FIG. 10(c) shows compressed image data with a high compression efficiency.

FIGS. 11(a)–11(c) are diagrams for explaining problems associated with data structures of conventional coded image signals, wherein FIG. 11(a) shows compressed image data which is suitable for use in independent reproduction, FIG. 11(b) shows compressed image data with high compression efficiency, and FIG. 11(c) shows compressed image data with high compression efficiency which is suitable for use in independent reproduction.

BEST MODE FOR CARRYING OUT THE INVENTION

Now, preferred embodiments of the present invention will be described.

[Embodiment 1]

An image transmission method of the first embodiment is capable of transmitting compressed image data obtained by compressively coding digital image data (moving picture data) corresponding to a moving picture comprising plural frames.

Assume that digital image data used in this embodiment is data represented as a digital image signal comprising a luminance signal and a chrominance signal. Also, the digital image signal may be an image signal corresponding to an image in a conventional image space (display image) of a rectangular shape or may be an image signal corresponding to an object region (VOP: Video Object Plane) including an object (an image of an arbitrary shape) on the display image.

Figure 1:
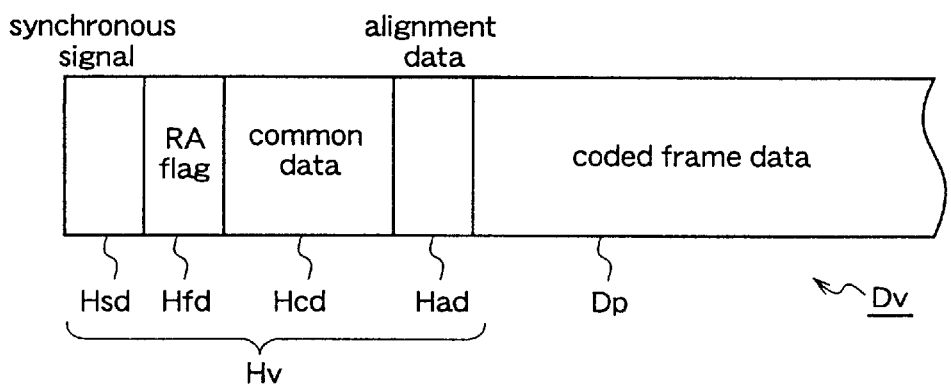
Figure 1:
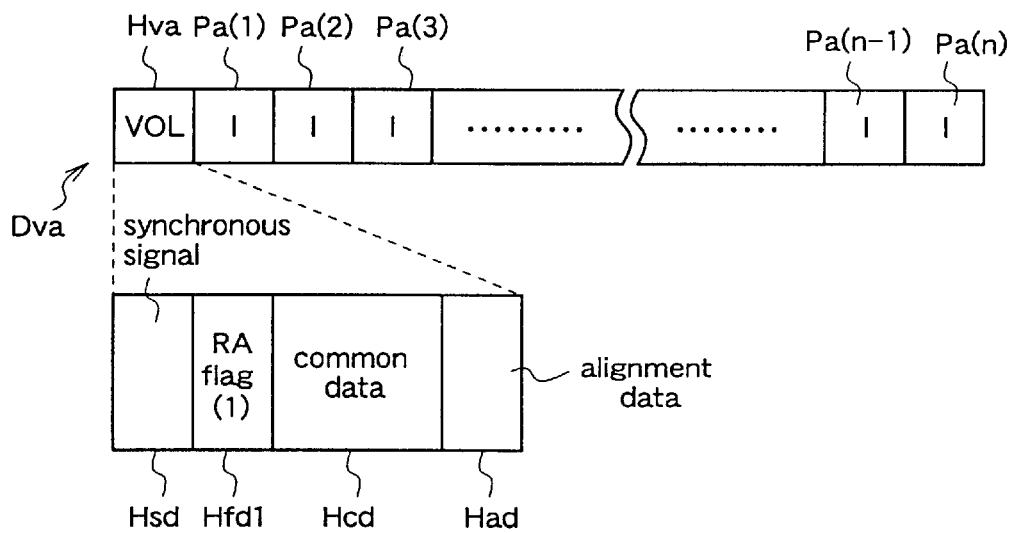
Figure 1:
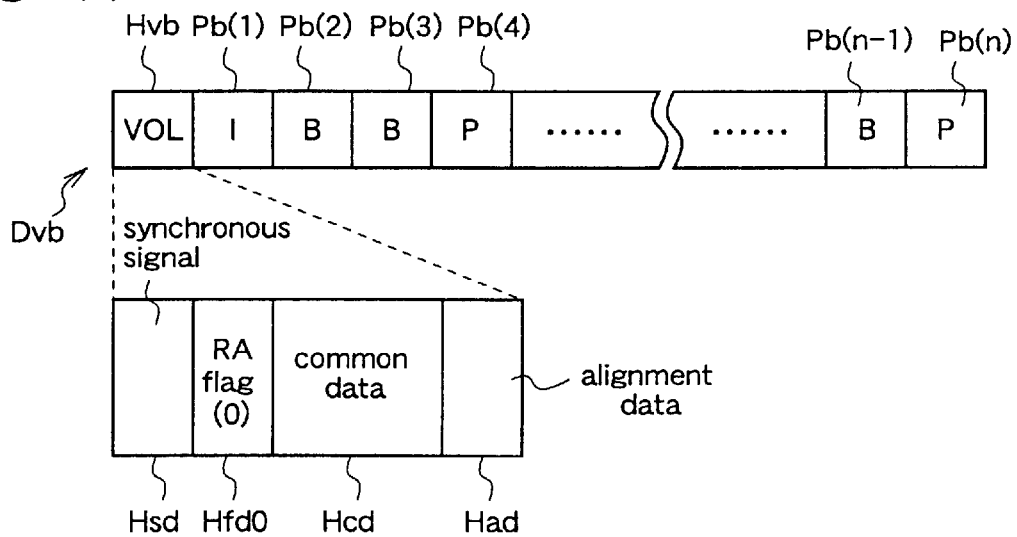

FIG. 1 is a diagram showing data structures of image signals according to the first embodiment, wherein FIG. 1(a) shows a data structure of a header of the compressed image data.

Compressed image data Dv comprises coded frame data Dp of respective frames and a header Hv added before the coded frame data Dp and indicating the attribute of the data Dp.

The coded frame data Dp is obtained by compressively coding image data corresponding to respective frames of a moving picture. The header Hv comprises a synchronous signal Hsd indicating the start of the compressed image data Dv, an identification flag (RA flag)Hfd indicating whether or not the compressed image data Dv is suitable for use in random reproduction, data (common data) Hcd common to respective frames, and alignment data Had for aligning the synchronous signal Hsd, the identification flag Hfd, and the common data Hcd. In the random reproduction, coded frame data corresponding to arbitrary frames is randomly selected and reproduced.

As already described in the prior art, the compressive coding process includes two types of processing, namely, the intra-frame coding process and the inter-frame coding process.

Figure 10:
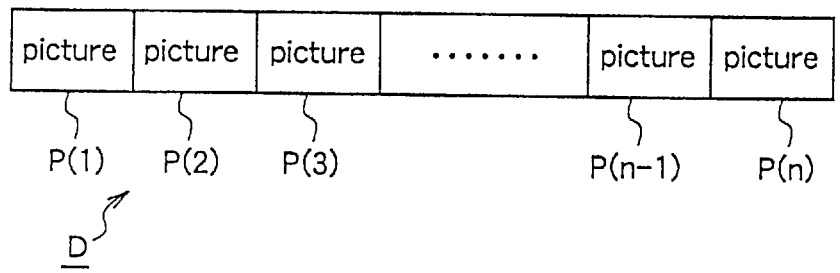
Figure 10:
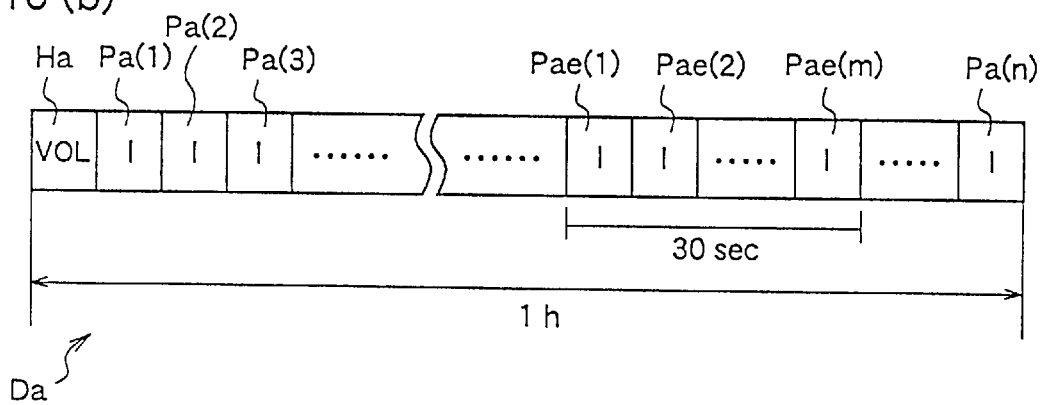
Figure 10:
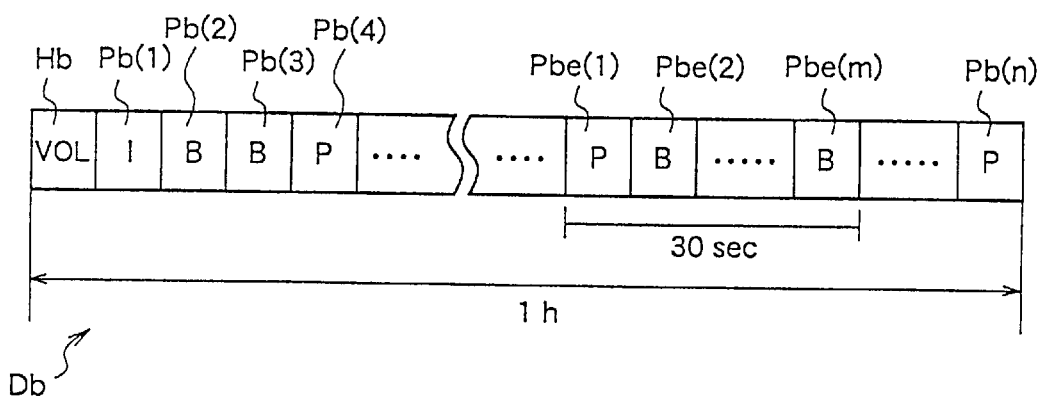

Turning to FIG. 1(b), first compressed image data Dva is obtained by performing the intra-frame coding process to frame data P(1)–P(n) (see FIG. 10(a)) corresponding to all the frames of the moving picture data D and is suitable for use in the random reproduction. Therefore, the value of the identification flag Hfd, in a header Hva of the first compressed image data Dva, is "1", indicating that the compressed image data Dva is suitable for use in the random reproduction.

Turning to FIG. 1(c), second compressed image data Dvb is obtained by performing the intra-frame coding process to the frame data P(1) corresponding to a frame at the beginning of the moving picture data D and by performing the inter-frame coding process to the following frame data P(2)–P(n), and is less suitable for use in the random reproduction. Therefore, the value of the identification flag Hfd0, in a header Hvb of the second compressed image data Dvb, is "0", indicating that the compressed image data Dvb is less suitable for use in the random reproduction.

In the transmission method of the first embodiment, the header including the common data is transmitted, and then the compressed frame data of respective frames is sequentially transmitted. When transmitting the header Hv, the synchronous signal Hsd, the identification flag Hfd, the common data Hcd, and the alignment data Had are transmitted in this order.

Subsequently, an image processing method of the first embodiment will be described.

In this image processing method, the digital image data D (see FIG. 10(a)) is compressively coded to produce one of the first compressed image data Dva and the second compressed image data Dvb as the compressed image data Dv.

Figure 2:
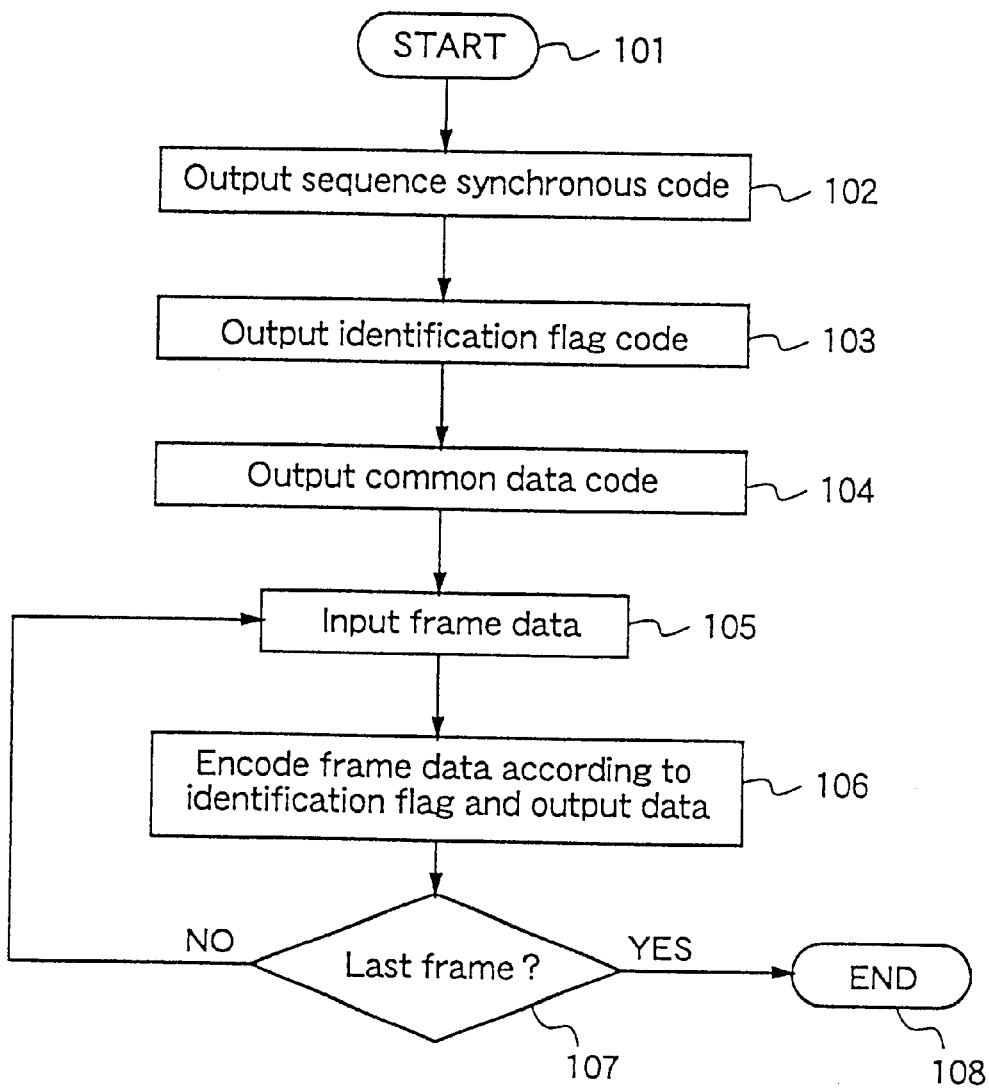
FIG. 2 is a flowchart for explaining an image coding process performed by an image processing method of the first embodiment.

FIG. 2 is a diagram for explaining the image processing method of the first embodiment and showing a flow of the coding process according to the processing method.

The coding process is started (Step 101). The sequence synchronous signal Hsd, indicating the start of the compressed image data Dv, is produced (Step 102). The synchronous signal Hsd is represented by a unique code (32 bits).

A code of the identification flag Hfd is produced (Step 103). The flag Hfd indicates whether or not all the frames of the digital moving picture are compressively coded without reference to a frame other than a target frame to-be processed. The value of the flag Hfd is "1" when all the frames are to be compressively coded without reference to another frame, and the value is "0" when they are not.

A code of the common data required for reproducing the compressed image data Dv at a reproducing end and a code of the alignment data and the like are produced (Step 104).

The data (frame data) corresponding to respective frames are sequentially compressively coded.

To be specific, when the frame data P(1) corresponding to the first frame is input (Step 105), the frame data is compressively coded to produce coded frame data Dp according to the value of the identification flag Efd (Step 106).

The Step 106 will be described in brief below.

When the value of the identification flag Hfd is "1", all the frame data P(1)–P(n) are intra-frame coded.

To be specific, the image data of each frame is divided into plural macroblocks (image spaces) each composed of (16×16) pixels in one frame. Further, the image data of each macroblock is divided into subblocks respectively corresponding to image spaces each composed of (8×8) pixels. The image data of each subblock is subjected to the DCT process to be transformed into DCT coefficients for each subblock, which are quantized to generate quantization coefficients, which are converted into a variable length code.

The macroblocks composing one frame are thus processed and the resulting coded frame data is output.

On the other hand, when the value of the identification flag Hfd is "0", the data P(1) is intra-frame coded, and the other frame data P(2)–P(n) is inter-frame coded.

The inter-frame coding process will be described in brief below.

Initially, by the method for detecting motion of an image on a frame such as "block matching", a prediction macroblock is detected. A region composed of (16×16) pixels with the smallest errors between pixel values thereof and pixel values of a target macroblock to-be-coded is detected as the prediction macroblock, from image data corresponding to a coded frame which is temporally adjacent to a frame to-be-coded.

Subsequently, the image data of the prediction macroblock is subtracted from the image data of the target macroblock to produce difference data of the target macroblock, which is divided into difference signals respectively corresponding to subblocks each composed of (8×8) pixels. Then, the difference signals are subjected to the DCT process for each subblock to generate the DCT coefficients, which are quantized for each subblock to generate quantization coefficients, which are converted into a variable length code.

The macroblocks composing one frame are thus processed and the resulting coded frame data is output.

Following the Step 106, it is decided whether or not input frame data is the last frame (Step 107). When decided that the input frame data is not the last frame, the Step 106 is performed again, or otherwise, the coding process is completed (Step 108).

The coding process is thus performed to produce either the compressed image data Dva shown in FIG. 1(b) which is suitable in random reproduction, or the compressed image data which is less suitable for the random reproduction shown in FIG. 1(c).

The compressed image data is transmitted to a decoding end via a communication line or stored in the storage medium and is then supplied thereto.

Figure 11:
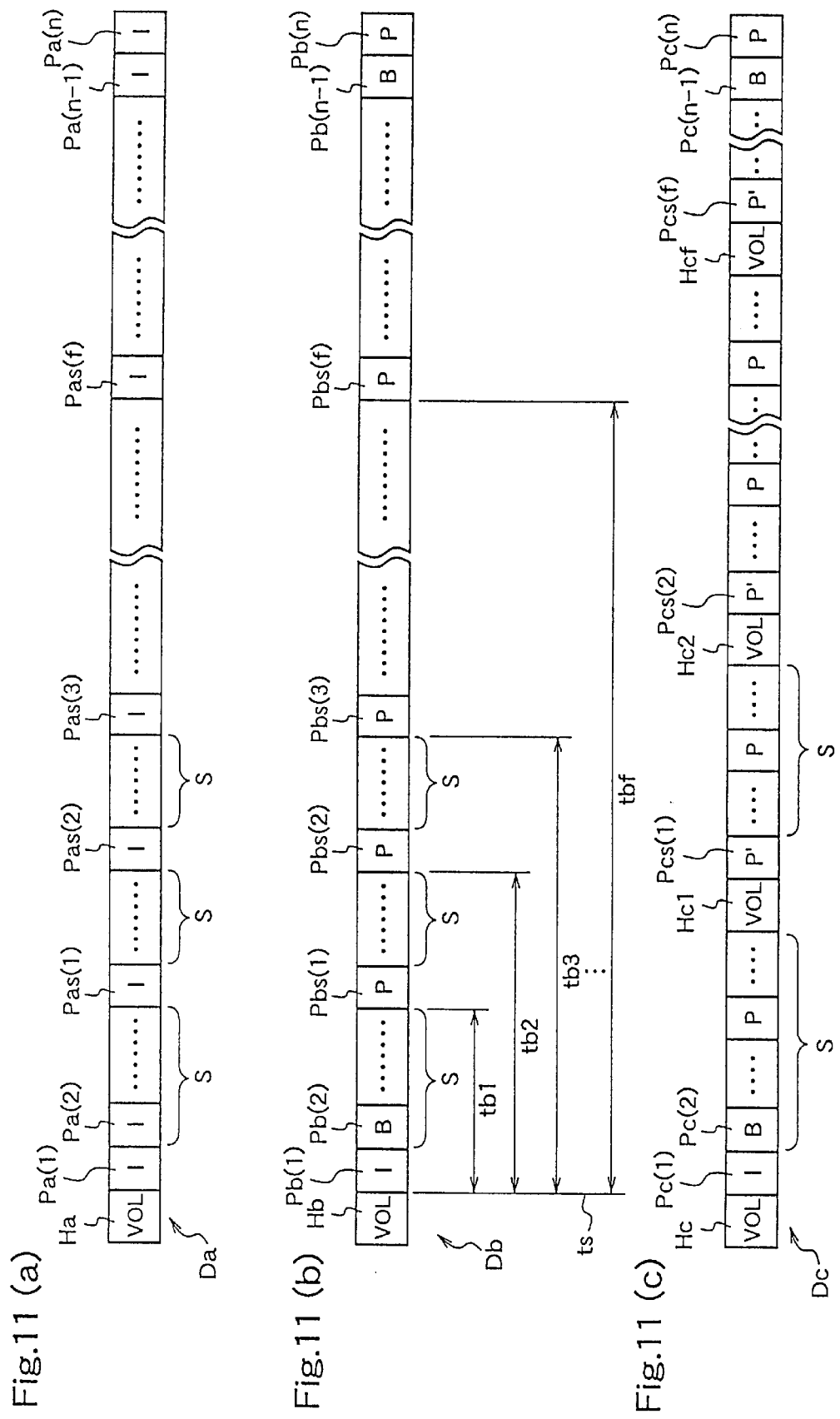
Figure 12:
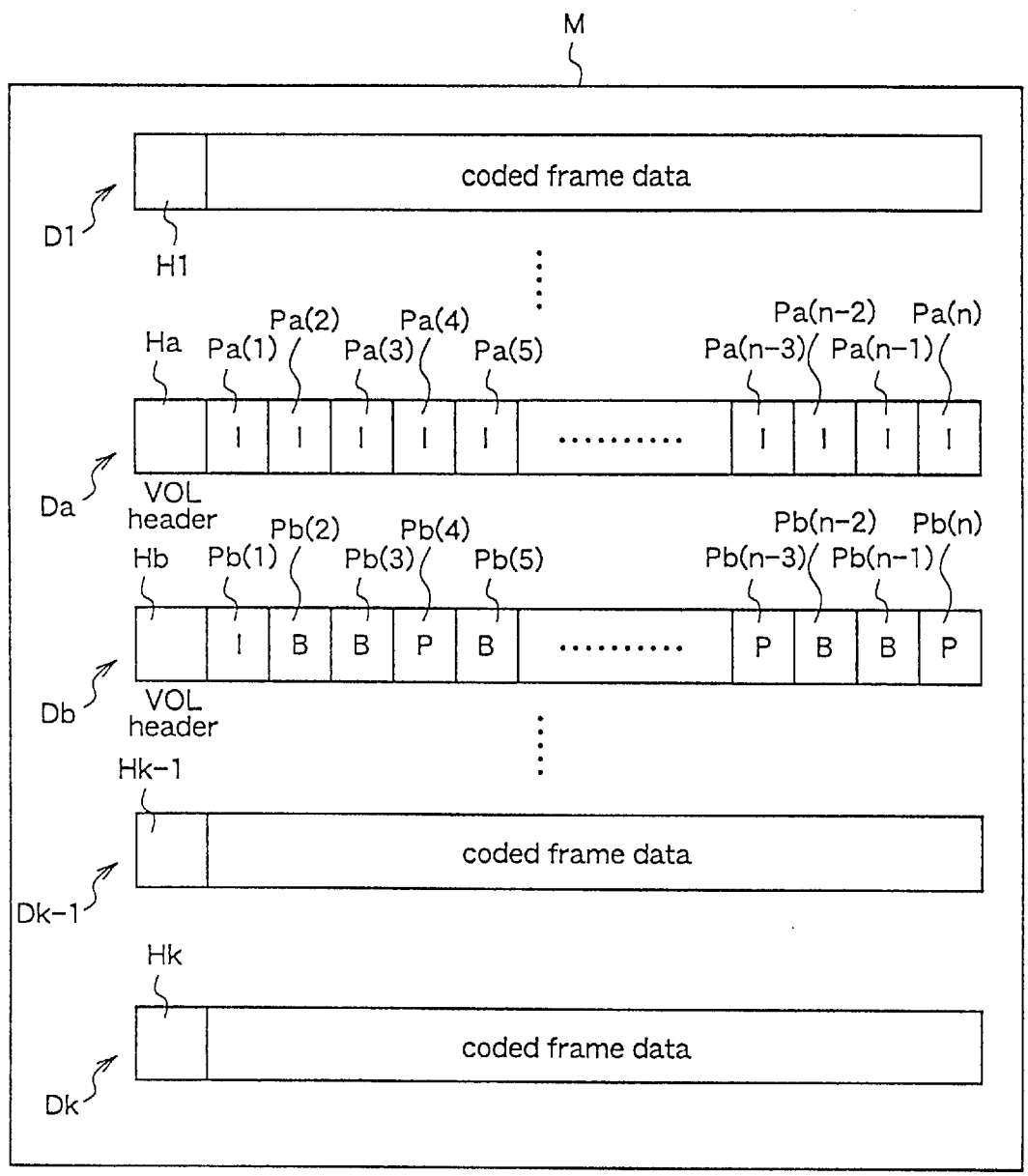
FIG. 12 is a conceptual diagram for explaining a data storage medium which contains compressed image data corresponding to various types of moving pictures
Figure 13:
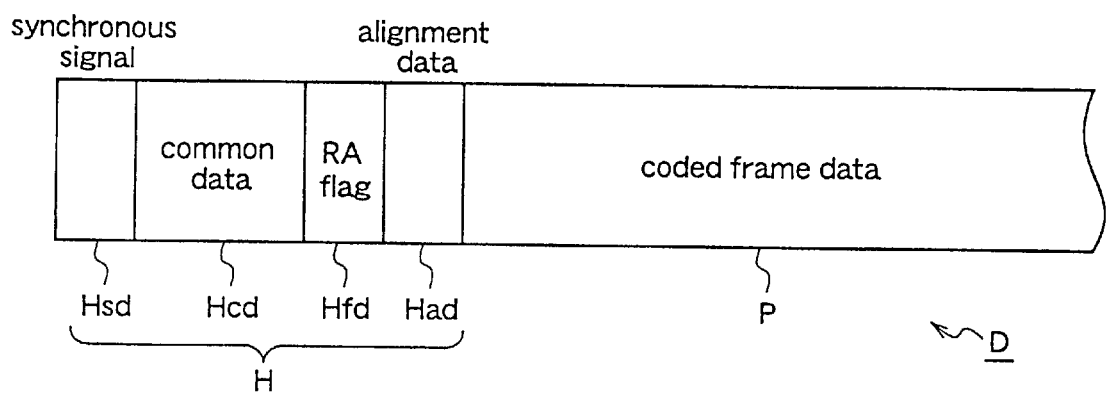
FIG. 13 is a diagram showing a sequence header included in conventional compressed image data.

The following tables 4, 5, and 6 show an example of a structure of the compressed image data so produced, in particular, data alignment of the header. These tables show the structure of the compressed image data Dv shown in FIG. 11(a). That is, these tables do not distinguish between the compressed image data Dva in FIG. 1(b) and the compressed image data Dvb in FIG. 1(c).

TABLE 4

| | Video Object Layer( ){ | No. of bits | Mnemonic |
|---|---|---|---|
| 801 | | | |
| 802 | video_object_layer_start_code /*4least significant bits specify video_object_layer_id value*/ | 32 | bslbf |
| 814 | random_accessible_vol | 1 | bslbf |
| | is_object_layer_identifier | 1 | uimsbf |
| | if(is_object_layer_identifier){ | | |
| 803 |    visual_object_layer_verid | 4 | uimsbf |
| |    visual_object_layer_priority | 3 | uimsbf |
| | } | | |
| | vol_control_parameters | 1 | bslbf |
| | if(vol_control_parameters) | | |
| |    aspect_ratio_info | 4 | uimsbf |
| |    vop_rate_code | 4 | uimsbf |
| 804 |    bit_rate | 30 | uimsbf |
| |    vbv_buffer_size | 18 | uimsbf |
| |    chroma_format | 2 | uimsbf |
| |    low_delay | 1 | uimsbf |
| | } | | |
| | video_object_layer_shape | 2 | uimsbf |
| 805 | vop_time_increment_resolution | 15 | uimsbf |
| | fixed_vop_rate | 1 | bslbf |
| 806 | if(video_object_layer_shape!="binary only"){ | | |
| |    if(video_object_layer_shape=="rectangular"){ | | |
| |      marker_bit | 1 | bslbf |
| |      video_object_layer_width | 13 | uimsbf |
| 807 |      marker_bit | 1 | bslbf |
| |      video_object_layer_height | 13 | uimsbf |
| |    } | | |
| | obmc_disable | 1 | bslbf |

TABLE 5

| | | No. of bits | Mnemonic |
|---|---|---|---|
| | sprite_enable | 1 | bslbf |
| | if(sprite_enable){ | | |
| |    sprite_width | 13 | uimsbf |
| |    marker_bit | 1 | bslbf |
| |    sprite_height | 13 | uimsbf |
| |    marker_bit | 1 | bslbf |
| |    sprite_left_coodinate | 13 | simsbf |
| |    marker_bit | 1 | bslbf |
| |    sprite_top_coodinate | 13 | simsbf |
| |    marker_bit | 1 | bslbf |
| |    no_of_sprite_warping_points | 6 | uimsbf |
| 808 |    sprite_warping_accuracy | 2 | uimsbf |
| |    sprite_brightness_change | 1 | bslbf |
| |    if(video_object_layer_shape=="rectangular"){ | | |
| |      init_sprite_width | 13 | uimsbf |
| |      marker_bit | 1 | bslbf |
| |      init_sprite_height | 13 | uimsbf |
| |      marker_bit | 1 | bslbf |
| |      init_sprite_left_coodinate | 13 | simsbf |
| |      marker_bit | 1 | bslbf |
| |      init_sprite_top_coodinate | 13 | simsbf |
| |    } | | |
| | } | | |
| | not_8_bit | 1 | bslbf |
| | if(not_8_bit){ | | |
| 809 |    quant_precision | 4 | uimsbf |
| |    bits_per_pixel | 4 | uimsbf |
| | } | | |
| | quant_type | 1 | bslbf |
| | if(quant_type){ | | |
| |    load_intra_quant_mat | 1 | bslbf |
| |    if(load_intra_quant_mat) | | |
| 810 |      intra_quant_mat | 8*[2–64] | uimsbf |
| |    load_nonintra_quant_mat | 1 | bslbf |
| |    if(load_nonintra_quant_mat) | | |
| |      nonintra_quant_mat | 8*[2–64] | uimsbf |
| | } | | |
| 811 | complexity_estimation_disable | 1 | bslbf |

TABLE 6

|     |     |     |     |
| --- | --- | --- | --- |
| 812 | { error_resilient_disable | 1 | bslbf |
|     | if(!error_resilient_disable){ |     |     |
|     | data_partitioned | 1 | bslbf |
|     | reversible_vlc | 1 | bslbf |
|     | } |     |     |
|     | scalability |     |     |
|     | if(scalability){ |     |     |
|     | ref_layer_id | 4 | uimsbf |
|     | ref_layer_sampling_direc | 1 | bslbf |
|     | hor_sampling_factor_n | 5 | uimsbf |
| 813 | hor_sampling_factor_m | 5 | uimsbf |
|     | vert_sampling_factor_n | 5 | uimsbf |
|     | vert_sampling_factor_m | 5 | uimsbf |
|     | enhancement_type | 1 | bslbf |
|     | } |     |     |
|     | } |     |     |
| 815 | ~ next_start_code( ) |     |     |
| 816 | { if(sprite_enable) |     |     |
|     | decode_init_sprite( ) |     |     |
|     | do{ |     |     |
|     | if(next_bits( )=group_of_vop_start_code) |     |     |
|     | Group_of_Video object Plane( ) |     |     |
| 817 | Video Object Plane( ) |     |     |
|     | }while((next_bits( )=group_of_vop_start_code)|| |     |     |
|     | (next_bits( )=vop_start_code) |     |     |
|     | } |     |     |

The data listed in the tables 4–6 are continuously aligned in the transmission order.

At the beginning of the header, placed is a synchronous signal 802 indicating the start of the moving picture. The synchronous signal 802 is represented by a fixed-length code (32 bits). Following the synchronous signal 802, placed is data 814 corresponding to a 1-bit identification flag Hfd. Following the data 814, placed is data (common data) 803–813 common to respective frames. In the common data 803–813, the data 803–809 and 811–813 are each represented by a code having plural fixed-bit lengths and the data 810 is represented by a variable-length code. Following the common data 803–813, placed is alignment data 815, which aligns the synchronous signal 802, the identification flag code 814, and the common data 803–813.

Following the alignment data 815, placed are data 816 and 817 relating to coded frame data obtained by performing the intra-frame coding process or the inter-frame coding process to frames of the moving picture. In actuality, these data 816 and 817 includes DCT coefficients or quantization steps according to MPEG 1, 2, and 4, although these are shown as one data group in this illustrated example.

Although the data 814 corresponding to the identification flag Hfd is placed just after the sequence synchronous signal (data 802), it may be placed after the data 803 (N bits spaced apart from the data 802). Preferably, the data 814 is placed before fixed-length code data with a decision condition or variable-length code data. In any case, it is desirable to dispose the data 814 near the head of the common data.

Hereinafter, a description will be given of an image processing apparatus (image coding apparatus) which performs the compressive coding process according to the image processing method of the first embodiment.

Figure 3:
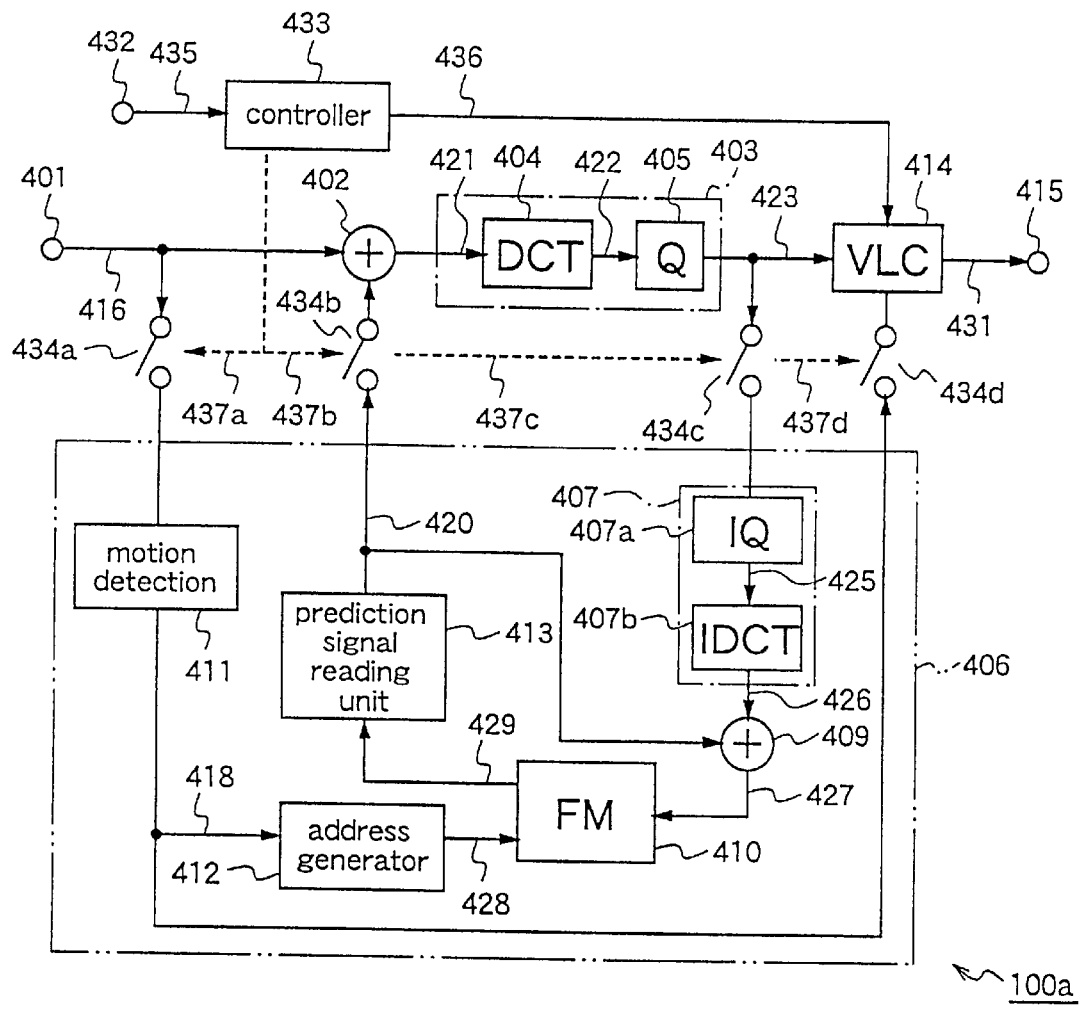
FIG. 3 is a block diagram showing a structure of an image processing apparatus which performs the image coding process of the first embodiment.

FIG. 3 is a block diagram showing the image coding apparatus of the first embodiment.

An image coding apparatus 100a is adapted to perform compressive coding of digital image data (moving picture data) corresponding to a moving image comprising plural frames to produce compressed image data.

The image coding apparatus 100a includes a prediction data generator 406 for generating prediction frame data 420 of target frame data corresponding to a frame to-be-processed, based on the target frame data, and an adder 402 for outputting difference frame data as a difference value between the target frame data 416 and the prediction frame data 420.

The image coding apparatus 100a further includes a data compressor 403 for compressing output data 421 from the adder to produce compressed data 423, and a variable length encoder 414 for performing variable length coding of the compressed data 423 output from the data compressor 403. The data compressor 403 comprises a DCT unit 404 for performing the DCT process to the output data 421 from the adder 402 and a quantizer 405 for quantizing the output data 422 from the DCT unit 404 and outputting the compressed data 423.

In the image coding apparatus 100a, moving picture data 416 is input to a first input terminal 401 and supplied to the prediction data generator 406 through a first switch 434a, while the prediction frame data 420 is supplied to the adder 402 through a second switch 434b. The compressed data 423 output from the data compressor 403 is supplied to the prediction data generator 406 through a third switch 434c, and motion information (motion vector) 418 generated by the prediction data generator 406 is output to the variable length encoder 414 through a fourth switch 434d.

The image coding apparatus 100a still further includes a controller 433 for generating header information 436 including data common to respective frames based on the digital image data and outputting the header information 436 to the variable length encoder 414, and on-off controlling the switches 434a–434d by using control signals 437a–437d, respectively. A control signal 435 externally input contains the identification flag Hfd indicating whether or not the compressed image data is suitable for use in the random reproduction in which compressed frame data corresponding to an arbitrary frame is selected and reproduced.

The variable length encoder 414 is used to perform variable length coding of the header information 436, the motion information 418, and the compressed data 423, and output a bit stream 431 as the compressed image data Dv to an output terminal 415. The variable length encoder 414 outputs the header Hv according to the header information 413. In the header Hv, from the starting code through the code just before the identification flag code are fixed in length.

The construction of the prediction data generator 406 will be described.

The prediction data generator 406 includes a data decompressor 407 which receives the compressed data 423 from the data compressor 403 through the third switch 434c, decompresses the compressed data 423 and outputs decompressed data 426, and a second adder 409 which adds the decompressed data 426 to the prediction frame data 420 and outputs reproduced data 427. The data decompressor 407 comprises an inverse quantizer 407a which inversely quantizes the compressed data 423 and an IDCT (inverse discrete cosine transform) unit 407b which subjects output data 425 of the inverse quantizer 407a to an IDCT process by transforming data in a frequency domain into data in a spatial domain and outputs the decompressed data 426.

The prediction data generator 406 further includes a frame memory 410 which contains an output (reproduced data) 427 of the second adder 409 as reference image data for a frame to be subsequently processed. The frame memory 410 is used to output data according to a read address signal 428 externally input.

The prediction data generator 406 still further includes a motion detector 411 which finds a motion vector MV of the target block of a frame being processed, based on the input digital image data 416, and outputs the motion vector MV, an address generator 412 which generates the read address signal 428 of the frame memory 410 according to the motion vector MV 418 from the motion detector 411, and a prediction signal reading unit 413 which reads data in an area in the frame memory 410 which is specified by the read address signal 428 and outputs the prediction frame data 420.

Subsequently, operation will be described.

The digital image data is input to the first input terminal 401, while information of the identification flag Hfd (flag information) 435 is input to the second input terminal 432. According to the flag information 435, the controller 433 generates the control signals 437a–437d in accordance with which the respective switches 434a–434d are on-off controlled. The control signals 437a–437d are the same signals.

When the identification flag Hfd indicates that the compressed image data Dv is suitable for use in the random reproduction, that is, its value is "1" the switches 434a–434d are turned off in accordance with the control signals 437a–437d from the controller 433, respectively. Thereby, the frame data corresponding to all the frames of the input digital image is intra-frame coded.

The digital image data passes the adder 402 and is sent to the data compressor 403, which performs data compression process (DCT process and quantization process) to the digital image data according to MPEG standard. The compressed data (quantization coefficients) 423 output from the data compressor 403 is transformed into the variable length code by the variable length encoder 414. The coded frame data Pa(1)–Pa(n) corresponding to the respective frames are thus produced. At this time, the variable length encoder 414 transforms the sequence synchronous signal (synchronous signal) Hsd, the identification flag (the value=1), the common data Hcd, and the alignment data Had into the corresponding codes, to form the header Hva. The header Hva is formed such that the synchronous signal Hsd, the identification flag Hfd1, the common data Hcd, and the alignment data Had are transmitted in this order.

The header Hva is added to the coded frame data Pa(1)–Pa(n) and the resulting compressed image data Dva is output from the variable length encoder 414.

On the other hand, when the identification flag Hfd indicates that the compressed image data Dv is less suitable for use in the random reproduction, that is, its value is "0", the switches 434a–434d are on-off controlled in accordance with the control signals 437a–437d from the controller 433, respectively. Thereby, for instance, the coded frame data P(1) corresponding to a first frame is intra-frame coded and the other frame data P(2)–P(n) corresponding to the following frames is inter-frame coded.

The intra-frame coding process is as described above, and therefore, the inter-frame coding process will be described below.

When the switches 434a–434d are turned off in accordance with the control signals 437a–434d from the controller 433, the input digital image data is inter-frame coded.

The prediction data generator 406 generates prediction data 420 for the frame to-be-processed based on the coded frame data. The first adder 402 subtracts the prediction frame data 420 from the frame data 416 corresponding to the frame to-be-processed to generate difference frame data 421. In the data compressor 403, the DCT unit 404 transforms the difference frame data 421 into data 422 in the frequency domain, and further, the quantizer 405 quantizes the data 422 into quantization coefficients. The resulting compressed data 423 is output to the variable length encoder 414.

The variable length encoder 414 transforms the compressed data (quantization coefficients) 423 into variable length codes to produce the coded frame data Pb(2)–Pb(n).

The compressed data 423 is also input to the prediction data generator 406 through the third switch 434c. In the data decompressor 407, the inverse quantizer 407a inversely quantizes the compressed data 423 into the data 425 in the frequency domain, and the inverse IDCT unit 407b transforms the data 425 into the data 426 in the spatial domain and outputs restored data.

The second adder 409 adds the restored data 426 to the prediction data 420 and outputs reproduced data 427, which is stored in the frame memory 410 as reference data used for coding a subsequent frame.

The motion detector 411 detects the motion information of the image between frames by block matching or the like based on the input digital image data 416, and outputs the motion vector 418 to the address generator 412. The address generator 412 generates the address signal 428 for specifying a memory area in the frame memory 410 according to the motion vector 418. The prediction signal reading unit 413 reads the data in the memory area of the frame memory 410 specified by the address signal 428 as the prediction data 420 and outputs the prediction data 420 to the adder 402.

The motion vector 418 is sent to the variable length encoder 414 through the fourth switch 434d, to be transformed into variable length code by the same.

The coded frame data Pb(1)–Pb(n) is thus produced. At this time, the variable length encoder 414 transforms the sequence synchronous signal (synchronous signal Hsd), the identification flag Hfd2 (value=0), the common data Hcd, the alignment data Had, and the like into the corresponding codes, to form the header Hvb. The header Hvb is formed so that the synchronous signal Hsd, the identification flag Hfd2, the common data Hcd, and the alignment data Had are transmitted in this order.

The header Hvb is added to the coded frame data Pb(1)–Pb(n) and the resulting compressed image data Dvb is output from the variable length encoder 414.

Thus, in accordance with the first embodiment, when compressively coding digital image data corresponding to one moving picture to produce compressed image data, the identification flag indicating whether or not the compressed image data is suitable for use in the random (independent) reproduction is added just after the synchronous signal Hsd positioned at the beginning of the header. Therefore, it is possible to quickly analyze the identification flag when analyzing the header added to the compressed image data corresponding to one picture, and thereby decide whether or not the compressed image data is suitable for use in the random reproduction in a short time.

While in the first embodiment, the identification flag is placed just after the synchronous signal Hsd in the header Hv of the compressed image data Dv, the structure of the header is not limited to this.

Figure 4:
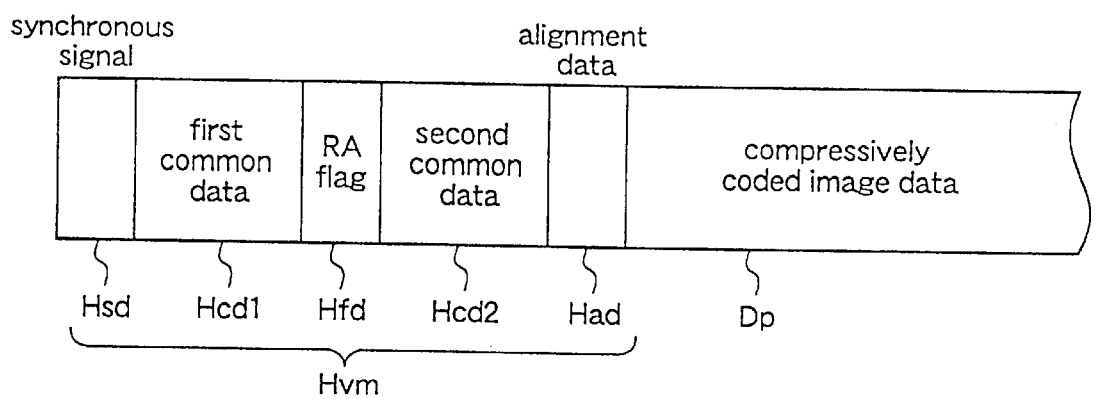
FIG. 4 is a diagram showing a data structure of compressed image data which is different from that of the compressed image data of the first embodiment.

For example, like a header Hvm shown in FIG. 4, the synchronous signal Hsd, first common data Hcd1 represented as a fixed-length code, an identification flag Hfd, second common data Hcd2 represented as a variable-length code, and alignment data Had may be aligned in this order.

[Modification of the First Embodiment]

Figure 5:
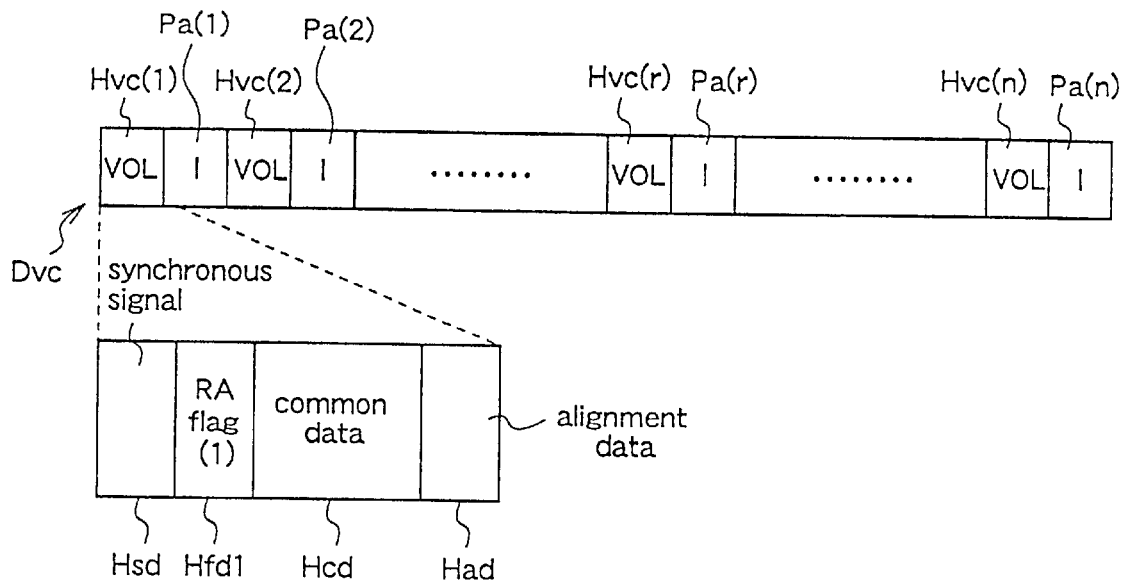
Figure 5:
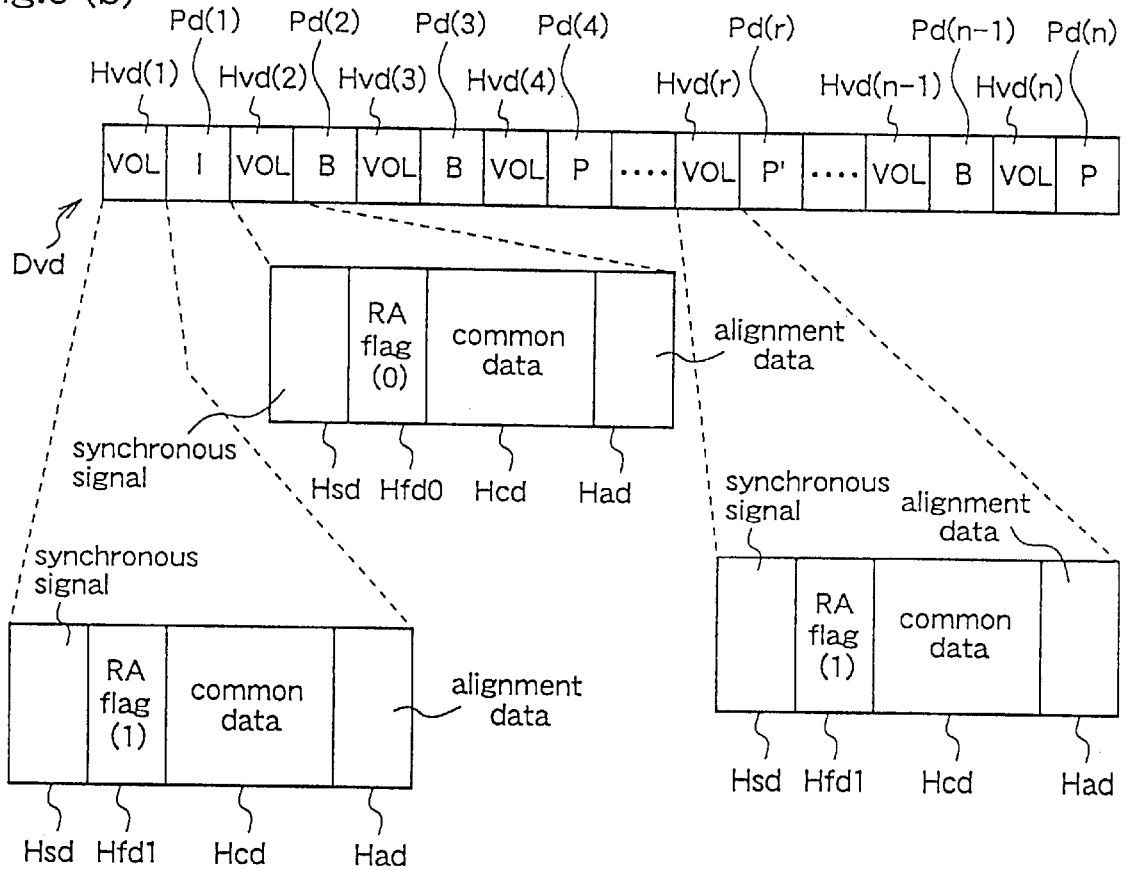
Figure 6:
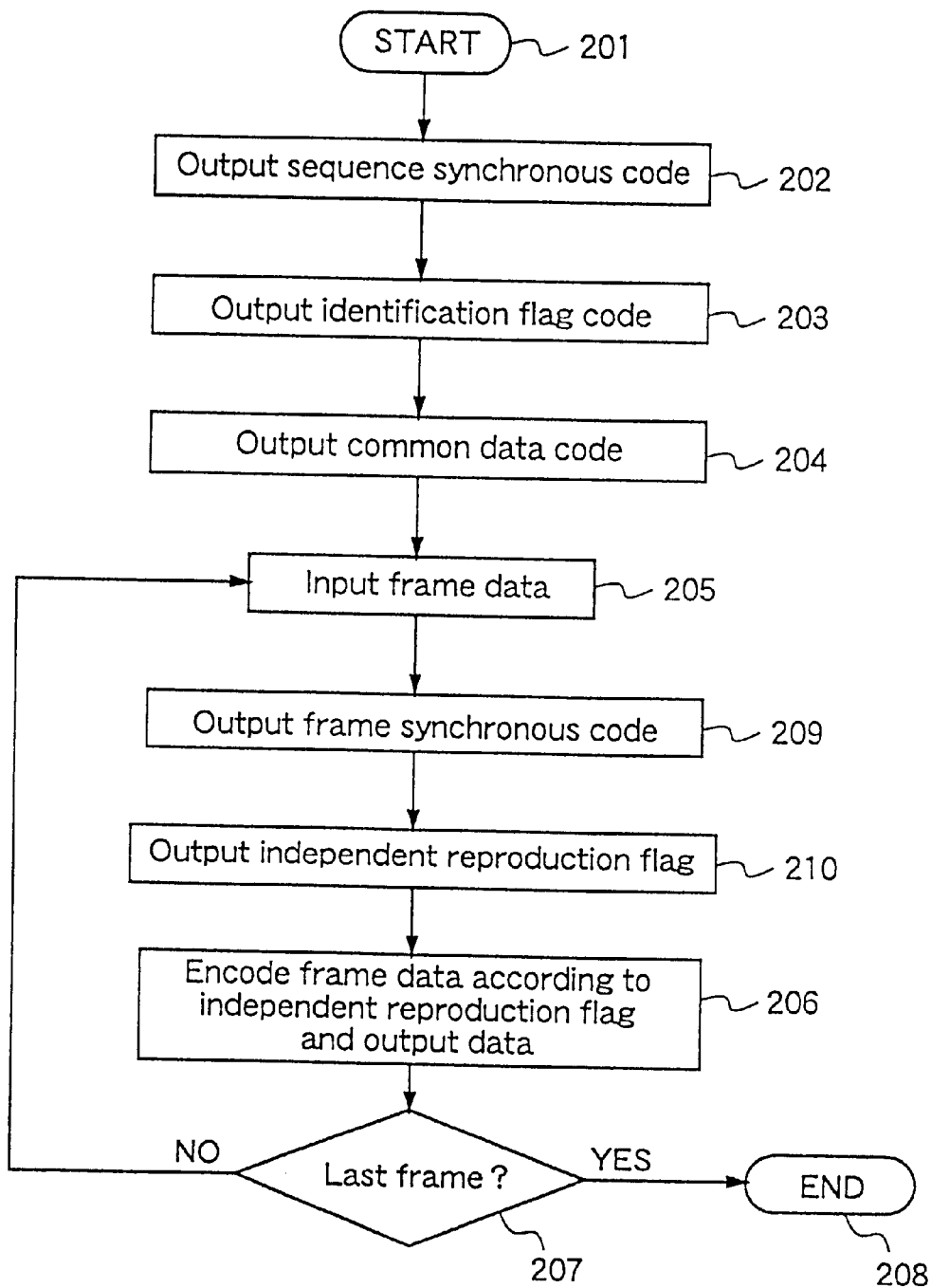
FIG. 6 is a flowchart for explaining an image coding process performed by the image processing method according to the modification of the first embodiment.

FIGS. 5 and 6 are diagrams for explaining an image transmission method and an image processing method according to modification of the first embodiment, respectively.

Shown in FIG. 5(a) is first compressed image data Dvc suitable for use in the random reproduction, and shown in FIG. 5(b) is second compressed image data Dvd less suitable for use in the random reproduction.

The first compressed image data Dvc is obtained by performing the intra-frame coding process to the frame data P(1)–P(n)(see FIG. 10(a)) of respective frame of the moving picture data D. In the compressed image data Dvc, frame headers (VLO) Hvc(1)–Hvc(n) are added before the coded frame data Pa(1)–Pa(n), respectively. Each of the headers Hvc(1)–Hvc(n) contains a flag Hfd1 indicating whether or not each of the corresponding coded frame data Pa(1)–Pa(n) is independently(randomly) reproducible.

Since the coded frame data Pa(1)–Pa(n) is obtained by the intra-frame coding process, the value of the flag Hfd1 in each of the headers Hvc(1)–Hvc(n) is "1", indicating that the corresponding coded frame data is randomly reproducible.

In each of the headers Hvc(1)–Hvc(n), like the header Hv included in the first compressed image data Dv shown in FIG. 1, the synchronous signal Hsd, the flag Hfd1, the common data Hdc, and the alignment data Had are aligned in this order. Like the first embodiment, the header including the identification flag Hfd indicating that the compressed image data Dvc is suitable for use in the random reproduction, is added to the compressed image data Dvc, although this is not shown.

The second compressed image data Dvd is obtained by performing the intra-frame coding process to frame data corresponding to specified frames of the moving picture data D and by performing the inter-frame coding process to the other frames.

Also in the compressed image data Dvd, like the compressed image data Dvc, frame headers (VOL) Hvd(1), . . . , Hvd(r), . . . , Hvd(n) are added before the coded frame data Pd(1), . . . , Pd(r), . . . , Pd(n), respectively. Each of the frame headers (VOL) Hvd(1), . . . , Hvd(r), . . . , Hvd(n) contains a flag Hfd1 or a flag Hfd0 indicating whether or not each of the corresponding coded frame data Pd(1), . . . , Pd(r), . . . , Pd(n) is randomly reproducible.

Since the coded frame data Pd(1) and Pd(r) are obtained by the intra-frame coding process, the value of the flag Hfd1 in each of the headers Hvd(1) and Hvd(r) is "1", indicating that each of the coded frame data Pd(1) and Pd(r) is randomly reproducible. On the other hand, the coded frame data Pd(2), Pd(3), Pd(4), . . . , Pd(n−1), Pd(n) are obtained by the inter-frame coding process, the value of the flag Hfd0 in each of the headers Hvd(2), Hvd(3), Hvd(4), . . . , Hvd(n−1), Hvd(n) is "0", indicating that each of the coded frame data Pd(2), Pd(3), Pd(4), . . . , Pd(n−1), Pd(n) is not randomly reproducible.

In each of the headers Hvd(1), . . . , Hvd(r), . . . , Hvd(n), like the header Hv of the compressed image data Dv of the first embodiment shown in FIG. 1, the synchronous signal Hsd, the flag Hfd1 or Hfd0, the common data Hcd, and the alignment data Had are aligned in this order. Like the first embodiment, the header including the identification flag Hfd indicating that the compressed image data Dvd is less suitable for use in the random reproduction, is added to the compressed image data Dvd, although this is not shown.

In this first transmission method of the modification, the header of the whole compressed image data is first transmitted and then compressed frame data (coded frame data) of respective frames is sequentially transmitted together with the corresponding frame headers. When transmitting the header of the whole compressed image data, or the frame header Hvc or Hvd, the synchronous signal Hsd, the identification flag Hfd, or the flag Hfd1 or Hfd0, the common data Hcd, and the alignment data Had are transmitted in this order.

An image processing method according to the modification will be described.

FIG. 6 is a diagram for explaining the image processing method of the modification to which the image processing method of the first embodiment in FIG. 2 has been extended.

In this image processing method of the modification, the Steps 105–107 included in the processing method of the first embodiment in FIG. 2 are replaced by Step 205, Step 209, Step 210, and Step 207 shown in FIG. 6. The other Steps 201–204, and 208 included in the method of the modification are identical to the Step 101–104, and 108 included in the method of the first embodiment.

This will be described in detail below.

Turning to FIG. 6, the coding process is started (Step 201). The sequence synchronous signal Hsd indicating the start of the compressed image data Dv is generated (Step 202). The synchronous signal Hsd is represented by a unique code (32 bits).

Subsequently, a code of the identification flag Hfd is generated (Step 203). When all the frames of the digital moving picture are to be compressively coded without reference to another frames, the value of the identification flag Hfd is "1", whereas when they are not, the value is "0".

A code of the common data required for reproducing the compressed image data Dv at the reproducing end and a code of the alignment data are produced (Step 204).

The frame data of respective frames of the moving picture are sequentially compressively coded (Steps 205, 209 210, 207).

To be more detailed, the frame data is input (step 205). A frame synchronous signal is generated (Step 209). The frame synchronous signal is different from the sequence synchronous signal in Step 202 in that it is represented by a unique code indicating the start of each frame. A flag indicating whether or not coded frame data of a target frame is independently reproducible (Step 210). According to the value of the identification flag Hfd and the value of the flag indicating whether or not the coded frame data is independently reproducible, the input frame data is compressively coded to produce coded frame data (Step 206).

The coding process in Step 206 is identical to that in Step 106 of the first embodiment.

To be specific, when the value of the identification flag Hfd is "1 ", all the frame data P(1)–P(n) of the moving picture data D is intra-frame coded, while when the value of the flag Hfd is "0", according to the flag relating to possibility of independent reproduction, specified frame data of the moving picture D is intra-frame coded and the other frame data is inter-frame coded.

Following the Step 206, it is decided whether or not the input frame data is the last frame (Step 207). When decided that the input frame data is not the last frame, generation of the frame synchronous signal in step 209, generation of the flag relating to possibility of independent reproduction in step 210, and the coding process in Step 206 are performed again, or otherwise, the coding process is completed (Step 208).

The coding process is thus performed to produce either the compressed image data Dvc suitable for use in the random reproduction as shown in FIG. 5(a) or the compressed image data Dvd with high coding efficiency which is less suitable for use in the random reproduction as shown in FIG. 5(b).

These compressed image data is transmitted to the decoding end via the communication line or stored in the storage medium to be supplied to the decoding end.

In accordance with the modification of the first embodiment, in addition to the coding process performed by the image processing method of the first embodiment, the frame header (auxiliary header) is added to the coded frame data (compressed frame data)of each of the frames of the compressed image data, the frame header includes the flag indicating whether or not the corresponding coded frame data is independently reproducible, and from the starting code of the frame header through the code immediately before the flag are fixed in length. Therefore, it is possible to quickly analyze the identification flag included in the header of the whole compressed image data and the flag included in the frame header when analyzing the frame header added to the coded frame data. In this modification, when performing the fast forward playback process to the compressed image data, according to the flag included in the frame header, whether or not the coded frame data of each frame is independently reproducible is decided quickly, whereby the fast reproduction process can be performed preferably.

[Embodiment 2]

Hereinafter, an image processing method according to a second embodiment of the invention will be described.

In this image processing method, compressed image data which is obtained by compressively coding digital image data corresponding to an image comprising a plurality of frames, is decoded to provide reproduced image data corresponding to the image. In this second embodiment, it is premised that the compressed image data to be decoded is the compressed image data Dv having the data structure shown in FIG. 1(a). To be specific, the compressed image data Dv is either the compressed image data Dva suitable for use in the random reproduction (FIG. 1(b)) or the compressed image data Dvb which is less suitable for use in the random reproduction but has high coding efficiency (FIG. 1(c)).

Figure 7:
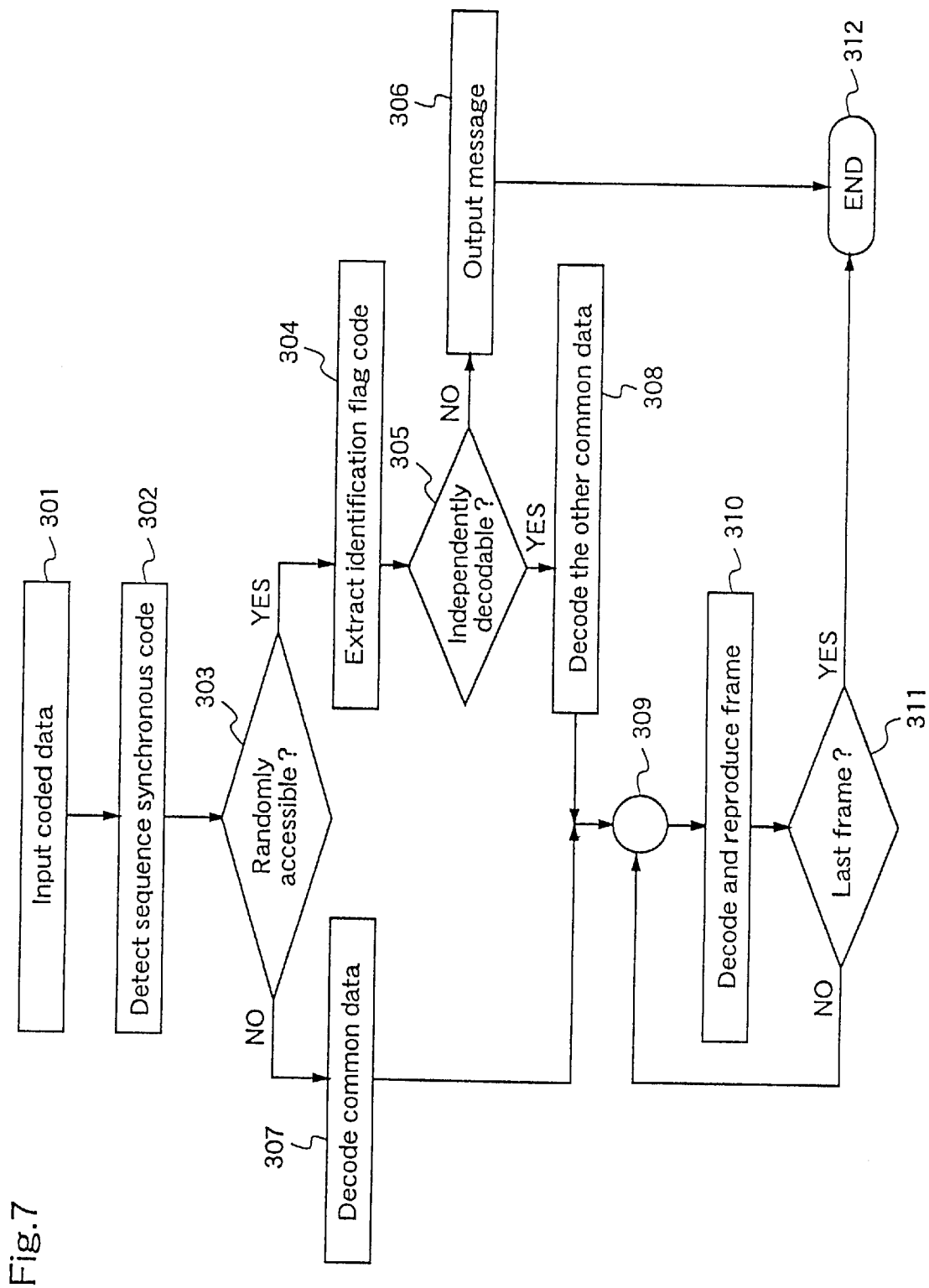
FIG. 7 is a flowchart for explaining an image decoding process according to an image processing method according to a second embodiment of the present invention.

FIG. 7 is a diagram for explaining the image processing method according to this second embodiment, illustrating the flow of a decoding process by the image processing method.

Initially, when the compressed image data Dv which has been coded by the image processing method of the first embodiment (specific data structure of which is shown in Table 4–Table 6) is input (step 301), the sequence synchronous signal in the header added to the compressed image data Dv in the coding process is detected (step 302). This sequence synchronous signal corresponds to data 802 in Table 4.

Subsequently, according to a control signal given by external operation, it is decided whether or not random access reproduction for fast forward playback, fast rewind playback, or image edition is to be performed (step 303). The control signal is given by external input, such as press operation of a fast forward button.

When the result of the decision in step 303 is that random access reproduction is not performed, the common data in the header (data 803–815 in Tables 4–6) are analyzed to prepare for decoding coded frame data corresponding to respective frames (step 307).

Thereafter, the coded frame data of respective frames is reproduced by a predetermined decoding method (step 310).

In this second embodiment, for the coded frame data of the I frame, the quantization coefficients corresponding to each subblock are subjected to inverse quantization and inverse DCT to reproduce image data corresponding to each macroblock, and this process is performed to all the macroblocks composing the frame.

For the coded frame data of the P frame or the B frame, inter-frame decoding with reference to reproduced data of another frame is performed.

To be specific, in the inter-frame decoding, the quantization coefficients (quantized DCT coefficients) of each subblock are subjected to inverse quantization and inverse DCT to restore difference data corresponding to each macroblock. Thereafter, prediction data for image data corresponding to a target macroblock (macroblock to be decoded) in a frame to be processed, is generated by motion compensation from image data of a frame which has already been decoded. The prediction data and the restored difference data are added to reproduce image data of the target macroblock.

Thereafter, it is decided whether or not the coded frame data to be decoded corresponds to the last frame in the compressed image data Dv (step 311). When the result of the decision is that the coded frame data does not correspond to the last frame, the decoding process in step 310 is carried out again. When the coded frame data corresponds to the last frame, decoding of the compressed image data Dv is ended (step 312).

On the other hand, when the result of the decision in step 303 is that random access reproduction is to be performed, initially, it is decided whether or not the compressed image data to be decoded is suitable for use in the random reproduction. That is, the identification flag Hfd, which has already been described for the coding process, is extracted (step 304). In this second embodiment, the data 814 of the identification flag Hfd is placed just after the data 802 (sequence synchronous signal). Therefore, the identification flag Hfd can be extracted immediately after analysis of the sequence synchronous signal.

Then, the value of the identification flag Hfd is checked to decide whether or not the input compressed image data Dv is suitable for use in the random access reproduction (independent reproduction) (step 305).

When the value of the identification flag Hfd is "1", this flag Hfd indicates that the compressed image data Dv is suitable for use in the independent reproduction, while when the value of the identification flag Hfd is "0", this flag Hfd indicates that the compressed image data Dv is less suitable for use in the independent reproduction.

When the result of the decision in step 305 is that the value of the identification flag Hfd is "1", the common data, which follows the identification flag Hfd and relates to image processing of the respective frames, is analyzed (step 308). Thereafter, the coded data corresponding to the respective frames is reproduced by decoding (step 310). The decoding process in step 310 in this case is different from the decoding process in the case where random access is not performed, only in that inter-frame decoding is not performed.

Thereafter, it is decided whether or not the coded frame data to be decoded corresponds to the last frame in the compressed image data Dv (step 311). When the result of the decision is that the coded frame data does not correspond to the last frame, the decoding process in step 310 is carried out again. When the coded frame data corresponds to the last frame, decoding of the compressed image data Dv is ended (step 312).

On the other hand, when the result of the decision in step 305 is that the value of the identification flag Hfd is "0", i.e., when the compressed image data Dv is less suitable for use in the independent reproduction, a message describing that the independent reproduction will not be performed is output (step 306), and decoding of the input compressed image data Dv is ended (step 312).

As described above, in the image decoding process according to the second embodiment, since the header of the input compressed image data Dv is constituted such that the identification flag Hfd is placed just after the sequence synchronous signal, it is possible to immediately decide whether or not the compressed image data Dv corresponding to a moving picture is suitable for use in the independent reproduction, i.e., whether or not all of the coded frame data corresponding to the respective frames composing the moving picture is independently reproducible.

While in this second embodiment detection of the sequence synchronous signal (step 302) is performed before random access decision (step 303), the step 302 may be performed after the step 303.

Further, while in this second embodiment the identification flag Hfd is placed just after the sequence synchronous signal in the header of the compressed image data Dv to be decoded, the identification flag Hfd may be placed after the N-bit fixed-length data in the header of the compressed image data Dv. In this case, when performing the random access, the identification flag Hfd is extracted without extracting the N-bit data in step 304, and analysis of data including the N-bit data is conducted in step 308.

Furthermore, when the identification flag Hfd is placed before the data with decision condition (fixed-length coded data) or the variable-length coded data, the flag indicating whether or not the data is independently reproducible can be immediately extracted without necessity of deciding the condition and, therefore, this is suitable for the random access. Especially in the case where the identification flag Hfd is placed before the variable-length code, when analyzing the data before the identification flag Hfd, it is not necessary to compare the data of the input header with the data prepared in the table, whereby the identification flag Hfd can be extracted immediately.

Moreover, the header structure of the whole compressed image data Dv is not restricted to that described above in which the identification flag is placed just after the synchronous signal Hsd. As shown in FIG. 5, a frame header including a flag relating to a possibility of independent reproduction may be given to each of coded frame data composing the compressed image data. In this case, since the flag exists for each frame, only checking the coded frame data corresponding to each frame is enough to decide whether or not this frame is independently reproducible. Also in this case, since the flag is placed just after the frame synchronous signal in the frame header, it can be decided in a short time whether or not the frame data is independently reproducible.

An image processing apparatus (image decoding apparatus) for performing the compressive decoding process by the image processing method according to the second embodiment, will now be described.

Figure 8:
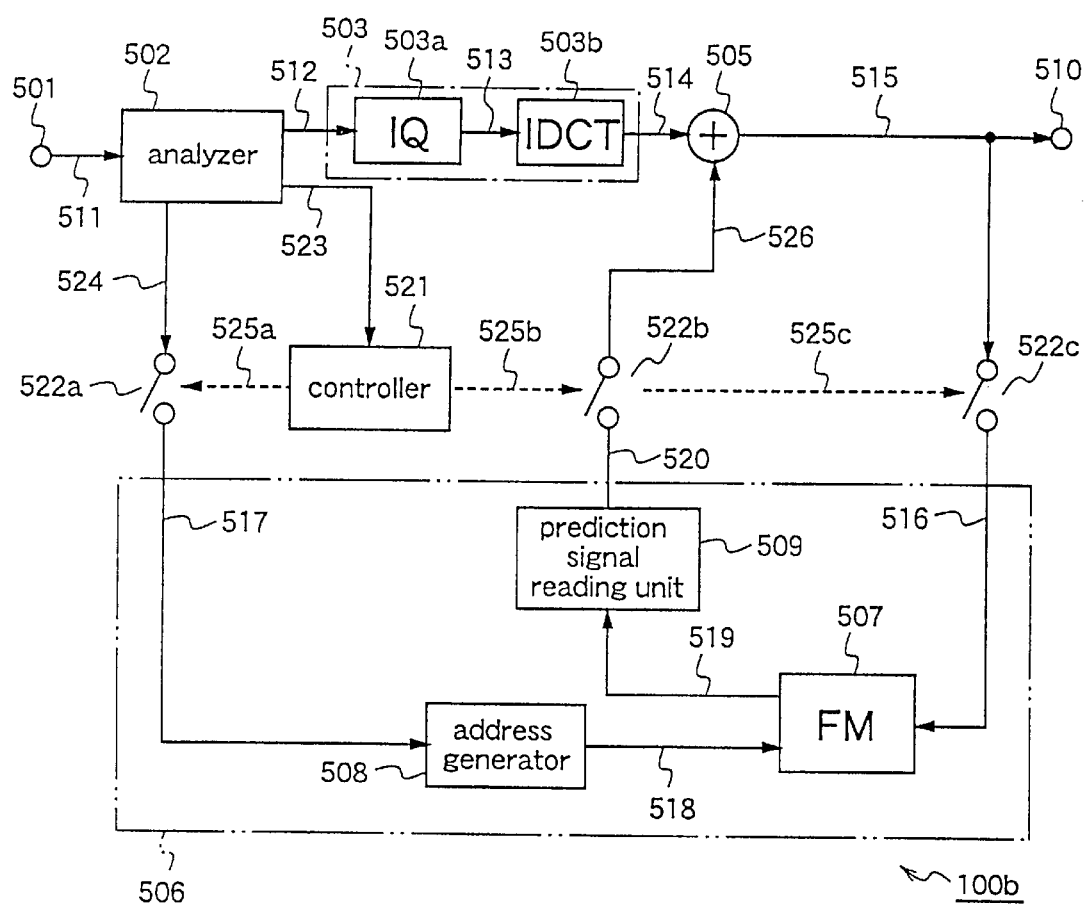
FIG. 8 is a block diagram showing an image processing apparatus which performs a decoding process of the second embodiment.

FIG. 8 is a block diagram illustrating the image decoding apparatus according to the second embodiment.

The image decoding apparatus 100b is adapted to receive compressed image data 511 which is obtained by compressively coding digital image data corresponding to an image comprising a plurality of frames, and to decode the compressed image data to provide reproduced image data corresponding to the image. In this second embodiment, it is premised that the compressed image data is generated by the image coding apparatus 100a according to the first embodiment.

To be specific, the image decoding apparatus 100b includes an analyzer 502 and a data decompressor 503. The analyzer 502 analyzes a header and the other data included in the compressed image data 511 to generate control information 523 or motion information 524, and analyzes data corresponding to each frame included in the compressed image data 511 to output compressed frame data 512. The decompressor 503 decompresses the compressed frame data 512 corresponding to each frame to generate decompressed frame data 514.

In this second embodiment, the analyzer 502 is constructed so as to analyze the identification flag without analyzing the common data composed of fixed-length codes extending from the beginning of the header before the identification flag. The data decompressor 503 comprises an inverse quantizer 503a and an inverse DCT unit 503b. The inverse quantizer 503a subjects the compressed image data to inverse quantization to generate data 513 in a frequency domain, and the inverse DCT unit 503b subjects the output of the inverse quantizer 503a to inverse DCT to transform the data in the frequency domain to data in a space domain and outputs the decompressed frame data 514.

The image decoding apparatus 100b further includes a prediction data generator 506 and an adder 505. The prediction data generator 506 generates prediction frame data 520 based on the decompressed frame data output from the data decompressor 503. The adder 505 adds the decompressed frame data corresponding to a target frame and the corresponding prediction frame data 520 to output reproduced frame data 515 to an output terminal 510.

In the image decoding apparatus 100b, the motion information (motion vector) 524 obtained by analysis by the analyzer 502 is supplied through the first switch 522a to the prediction data generator 506, and the prediction frame data 520 is supplied through the second switch 522b to the adder 505. Further, the reproduced frame data 515 output from the adder 505 is supplied through the third switch 522c to the prediction data generator 506.

Furthermore, the image decoding apparatus 100b includes a controller 521 which controls the switches 522a–522c by using control signals 525a–525c, based on the control information 523 obtained by analysis of the header by the analyzer 502.

The prediction data generator 506 will be described in more detail.

The prediction data generator 506 includes a frame memory 507 which stores the output (reproduced data) 515 of the adder 505 as reference image data for a frame to be processed next. The frame memory 507 outputs the data stored therein, according to a read address signal 518.

Further, the prediction data generator 506 includes an address generator 508 and a prediction signal reading unit 509. The address generator 508 generates the read address signal 518 to the frame memory 507, based on the motion vector 517 from the analyzer 502. The prediction signal reading unit 509 obtains data in an area specified by the read address signal 518 from the frame memory 507, and outputs it as the prediction frame data 520.

The operation of the image decoding apparatus 100*b* will be described.

When the compressed image data having the format shown in Table 4–Table 6 which has been compressively coded by the coding apparatus 100*a* of the first embodiment is input to the input terminal 501, initially, the analyzer 502 analyzes the header of the compressed image data to detect the sequence synchronous signal and the like. Meanwhile, an external control signal (not shown) indicating whether or not random access for fast forward playback, fast rewind playback, or image edition is to be performed is input to the analyzer 502, by an external input such as press operation of a fast forward button.

When the random access is not performed, the analyzer 502 analyzes the common data (data 803–815 in Tables 4–6) to prepare for a decoding of coded frame data of respective frames. In this case, the switches 522*a*–522*c* are each controlled according to the frame coding type (I picture, P picture, B picture) by the control signal from the controller 521.

Further, the analyzer 502 extracts the motion vector 524 based on the coded frame data of each frame in the compressed image data and, further, outputs a quantization scale and quantization coefficients of each frame as compressed data 512 to the data decompressor 503.

When the coded frame data has been obtained by the intra-frame coding process, the compressed data (quantization coefficients) 512 is subjected to inverse quantization by the quantizer 503*a* in the data decompressor 513 to be transformed to frequency-domain data 503, which is subjected to inverse DCT by the inverse DCT unit 503*b* to be transformed to space-domain data (decompressed data) 514. The inverse quantization and the inverse DCT are performed for each of subblocks composing one of macroblocks composing one frame. Then, the decompressed data 514 corresponding to each macroblock passes through the adder 505 and is output as reproduced data 515 through the output terminal 510.

When the coded frame data has been obtained by the inter-frame coding process, in the data decompressor 503, the compressed data (quantization coefficients) corresponding to each subblock is subjected to inverse quantization and inverse DCT, and thereby the difference data corresponding to each macroblock is restored as the decompressed data. Then, the adder 505 adds the difference data of a target macroblock to the corresponding prediction data and outputs the reproduced data 515.

In the prediction data generator 506, reproduced data of a frame which has already been decoded and is stored in the frame memory 507 is read from the frame memory 507 as prediction data for the target macroblock in the frame to be decoded, by motion compensation using the address generator 508 and the prediction signal reading unit 509, like the prediction process of the coding apparatus.

That is, in the prediction data generator 506, the address generator 508 generates the address signal 518 of the frame memory 507, based on the motion vector from the analyzer 502. Then, the prediction signal reading unit 509 obtains data in the area specified by the address signal as the prediction data 520.

Thereafter, the adder 505 adds the difference data from the data decompressor 503 and the prediction data and outputs reproduced data of the target macroblock.

On the other hand, when the random access is performed, the identification flag in the header of the compressed data to be decoded is analyzed to decide whether or not the compressed image data is suitable for use in the independent reproduction.

That is, the analyzer 502 extracts the identification flag 523 and outputs it to the controller 521.

In the header of the compressed image data, the data 814 corresponding to the identification flag Hfd is placed just after the data 802 corresponding to the sequence synchronous signal and, therefore, the identification flag Hfd can be extracted in a short time.

When the identification flag Hfd is input to the controller 512, the controller 521 analyzes the identification flag Hfd to decide whether or not the compressed image data is suitable for use in the random reproduction.

When decided the compressed image data is suitable for use in the independent reproduction (i.e., when the value of the identification flag Hfd is "1"), the analyzer 502 analyzes (performs variable length decoding of) the common data and, thereafter, the data decompressor 503 performs reproduction to provide reproduced data of coded frame data corresponding to a specified frame. In the decoding process, since inter-frame decoding is not carried out, unlike the decoding process in which the random access is not performed, the switches 522*a*–522*c* are held in the OFF states by the control signals from the controller 521.

When the value of the identification flag Hfd is "0" (i.e., when the compressed image data is less suitable for use in the independent reproduction), information describing that independent decoding should not be performed is supplied from the controller 521 to desired parts of the decoding apparatus.

As described above, according to the image decoding apparatus of the second embodiment, since the analysis of the sequence synchronous signal in the header of the compressed image data Dv is followed by the analysis of the identification flag Hfd, it is possible to immediately decide whether or not the compressed image data Dv corresponding to a moving picture is suitable for use in the independent reproduction, that is, whether or not all the coded frame data corresponding to the respective frames composing the moving picture is independently reproducible.

When an image processing program for performing the image processing according to any of the above-described embodiments and modifications by software is recorded in a data storage medium such as a floppy disk, the image processing can be easily implemented in an independent computer system.

Figure 9:
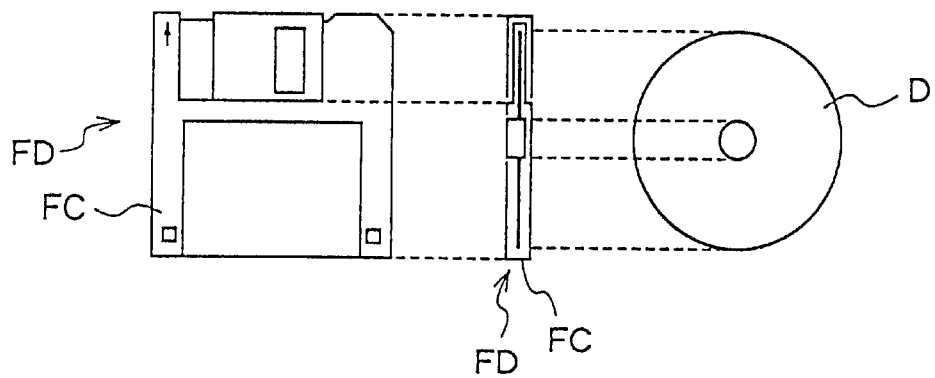
FIGS. 9(a)–9(b) are diagrams showing a data storage medium which contains programs making a computer system perform the coding process and the decoding process of each embodiment.
FIG. 9(c) is a diagram showing the computer system.
Figure 9:
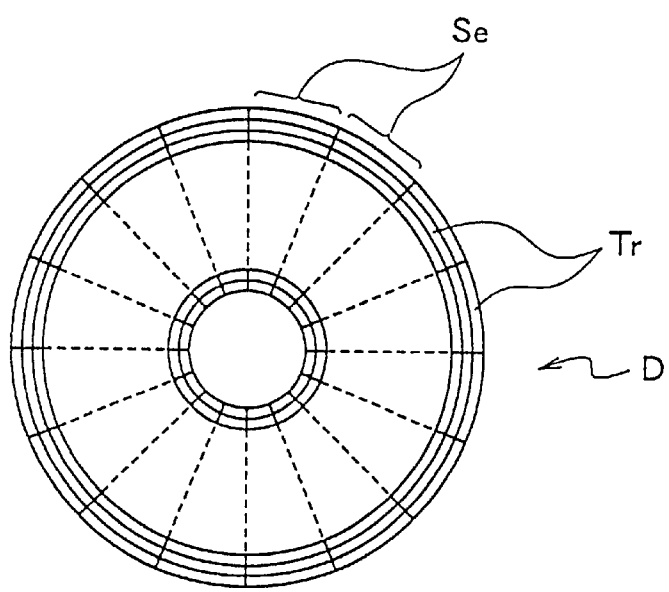
Figure 9:
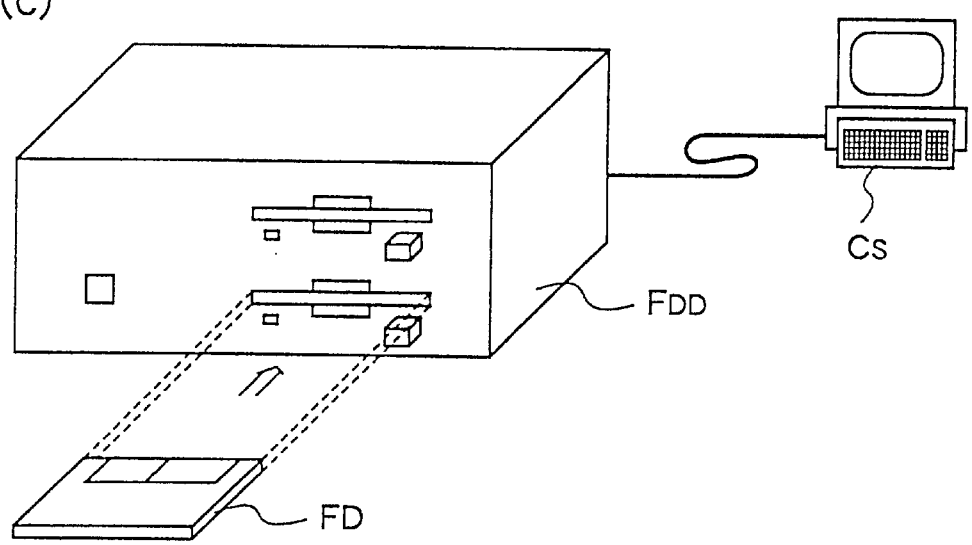

FIGS. 9(*a*)–9(*c*) are diagrams for explaining the case where the image processing according to any of the above-described embodiments and modifications is executed by a computer system, using a floppy disk which contains the image processing program.

FIG. 9(*a*) shows a front view of a floppy disk FD, a cross-sectional view thereof, and a floppy disk body D. FIG. 9(*b*) shows an example of a physical format of the floppy disk body D.

The floppy disk FD has the configuration in which a floppy disk case FC contains the floppy disk body D. On the surface of the floppy disk body D, a plurality of tracks Tr are formed concentrically from the outer circumference of the disk toward the inner circumference. Each track Tr is divided into 16 sectors (Se) in the angular direction. Therefore, in the floppy disk FD having the above-mentioned program, data of the program are recorded in the assigned sectors on the floppy disk body D.

FIG. 9(c) illustrates the structure for recording the program in the floppy disk FD and performing the image processing by software using the program stored in the floppy disk FD.

To be specific, when the program is recorded in the floppy disk FD, data of the program are written in the floppy disk FD from the computer system Cs through the floppy disk drive FDD. When the above-described image coding apparatus or image decoding apparatus is constructed in the computer system Cs by the program recorded in the floppy disk FD, the program is read from the floppy disk FD by the floppy disk drive FDD and then loaded to the computer system Cs.

While in the above description a floppy disk is employed as a data storage medium, an optical disk may be employed. Also in this case, coding or decoding by software can be performed in like manner as the case of using the floppy disk. Further, the data storage medium is not restricted to these disks. Any medium may be employed as long as it can contain the program, for example, an IC card, ROM cassette, etc. Also in the case of using these data storage media, image processing by software can be performed in like manner as the case of using the floppy disk.

Furthermore, when a coded image signal stored in a data storage medium such as a floppy disk has a data structure according to any of the embodiments and modifications of the invention, the coded image signal from the floppy disk can be decoded for image display, with the same effects as described for the decoding process of the first or second embodiment.

Industrial Applicability

According to image transmission method, the image processing method, the image processing apparatus, and the data storage medium of the present invention, compressed image data of an arbitrary frame of a moving picture can be randomly selected and reproduced within desired time without waiting time. Therefore, these are very useful in the image coding process and the image decoding process in the system which transmits or stores an image signal, and in particular, is suitable for use in random image processing for arbitrary frames such as fast forward playback, fast rewind playback, or edition of compressed moving picture data according to MPEG4.

What is claimed is:

1. An image processing method for decoding compressed image data obtained by compressively coding digital image data corresponding to an image comprising plural frames to provide reproduced image data corresponding to the image, said method comprising:

analyzing a header including data common to respective frames which is included in the compressed image data; and decoding compressed frame data obtained by compressively coding frame data of respective frames and included in the compressed image data to provide reproduced frame data;

wherein said analyzing the header comprises analyzing fixed length code data from code data at the beginning of the header to code data immediately before an identification flag included in the header, the identification flag indicating whether or not the compressed image data is suitable for use in a random reproduction process which randomly selects compressed frame data of arbitrary frames to provide reproduced frame data;

wherein said analyzing the header further comprises analyzing a synchronous signal indicating a head of the compressed image data, the identification flag, and the data common to respective frames, in this order.

2. An image processing method for decoding compressed image data obtained by compressively coding digital image data corresponding to an image comprising plural frames to provide reproduced image data corresponding to the image, said method comprising:

analyzing a header including data common to respective frames which is included in the compressed image data; and decoding compressed frame data obtained by compressively coding frame data of respective frames and included in the compressed image data to provide reproduced frame data;

wherein said analyzing the header comprises analyzing fixed length code data from code data at the beginning of the header to code data immediately before an identification flag included in the header, the identification flag indicating whether or not the compressed image data is suitable for use in a random reproduction process which randomly selects compressed frame data of arbitrary frames to provide reproduced frame data; and wherein said analyzing the header further comprises analyzing a synchronous signal indicating a head of the compressed image data, fixed length code data as the data common to respective frames, the idenfication flag, and the variable length code data as the common to respective frames, in this order.

3. An image processing method for decoding compressed image data obtained by compressively coding digital image data corresponding to an image comprising plural frames to provide reproduced image data corresponding to the image, said method comprising:

analyzing a header including common data which is common to respective frames which is included in the compressed image data, the common data comprising fixed length code common data and variable length code common data; and decoding compressed frame data obtained by compressively coding frame data of respective frames and included in the compressed image data to provide reproduced frame data;

wherein said analyzing the header comprises analyzing fixed length code data from code data at the beginning of the header to code data immediately before an identification flag included in the header, the identification flag indicating whether or not the compressed image data is suitable for use in a random reproduction process which randomly selects compressed frame data of arbitrary frames to provide reproduced frame data; and wherein said analyzing the header further comprises analyzing a synchronous signal indicating a head of the compressed image data, the fixed length code common data, the identification flag, and the variable length code common data, in this order.

4. An image processing method for decoding compressed image data obtained by compressively coding digital image data corresponding to an image comprising plural frames to provide reproduced image data corresponding to the image, said method comprising:

analyzing a header including data common to respective frames which is included in the compressed image data; and decoding compressed frame data obtained by compressively coding frame data of respective frames and included in the compressed image data to provide reproduced frame data;

wherein said analyzing the header comprises analyzing fixed length code data from code data at the beginning of the header to code data immediately before an identification flag included in the header, the identification flag indicating whether or not the compressed image data is suitable for use in a random reproduction process which randomly selects compressed frame data of arbitrary frames to provide reproduced frame data;

wherein said analyzing the header further comprises analyzing a synchronous signal indicating a head of the compressed image data, the identification flag, and the data common to respective frames, in this order; and wherein said decoding compressed frame data is performed after said analyzing the header.

5. An image processing method for decoding compressed image data obtained by compressively coding digital image data corresponding to an image comprising plural frames to provide reproduced image data corresponding to the image, said method comprising:

analyzing a header including data common to respective frames which is included in the compressed image data; and decoding compressed frame data obtained by compressively coding frame data of respective frames and included in the compressed image data to provide reproduced frame data;

wherein said analyzing the header comprises analyzing fixed length code data from code data at the beginning of the header to code data immediately before an identification flag included in the header, the identification flag indicating whether or not the compressed image data is suitable for use in a random reproduction process which randomly selects compressed frame data of arbitrary frames to provide reproduced frame data;

wherein said analyzing the header further comprises analyzing a synchronous signal indicating a head of the compressed image data, fixed length code data as the data common to respective frames, the identification flag, and variable length code data as the data common to respective frames, in this order; and wherein said decoding compressed frame data is performed after said analyzing the header.

* * * * *

UNITED STATES PATENT AND TRADEMARK OFFICE
CERTIFICATE OF CORRECTION

PATENT NO.     : 6,400,889 B1
DATED          : June 4, 2002
INVENTOR(S)    : Choong Seng Boon It is certified that error appears in the above-identified patent and that said Letters Patent is hereby corrected as shown below:

Column 5,
Line 4, replace "data such" with -- data. Such --.
Line 48, replace "reproducible the" with -- reproducible, the --.

Column 7,
Table 2, lines 23-45, insert -- { -- the parenthesis beginning at "sprite_enable" and ending at "}".
Table 2, lines 38-42, please delete "{" beginning at "marker_bit" and ending at "marker_bit".
Table 2, lines 51-58, insert -- 910 { -- the parenthesis beginning at "quant_type" and ending at "}".

Column 9,
Table 3, line 5, replace "hor_sampline_factor_m" with -- hor_sampling_factor_m --.
Table 3, line 13, replace "if(sprite-$^{enable)}$" with -- if (sprite_enable) --.
Table 3, line 14, replace "$^{decode}$_init_sprite()" with -- decode_init_sprite() --.

Column 12,
Line 50, replace "thee" with -- the --.

Column 14,
Line 30, delete "of claim 13".

Column 17,
Line 54, replace "5*(a)*-5*(b)* diagrams" with -- 5*(a)*-5*(b)* are diagrams --.

Column 19,
Line 60, replace "Efd" with -- Hfd --.

Column 21,
Table 5, lines 32-51, insert -- { -- the parenthesis beginning at "sprite_enable" and ending at "}".
Table 5, lines 45-49, please delete "}" beginning at "marker_bit" and ending at "marker_bit".

UNITED STATES PATENT AND TRADEMARK OFFICE
CERTIFICATE OF CORRECTION

PATENT NO.    : 6,400,889 B1
DATED         : June 4, 2002
INVENTOR(S)   : Choong Seng Boon It is certified that error appears in the above-identified patent and that said Letters Patent is hereby corrected as shown below:

Column 23,
Table 6, line 7, insert -- 1 bs/bf -- following "scalability".
Table 6, line 19, replace "if(sprite_$^{enable}$)" with -- if(sprite_enable) --.
Table 6, line 20, replace "$^{decode}$_init_sprite()" with -- decode_init_sprite() --.

Column 28,
Line 55, replace "205, 209 210," with -- 205, 209, 210 --.
Line 57, replace "step" with -- Step --.

Signed and Sealed this

First Day of April, 2003

JAMES E. ROGAN
*Director of the United States Patent and Trademark Office*